United States Patent
Efrat et al.

(10) Patent No.: US 6,570,587 B1
(45) Date of Patent: May 27, 2003

(54) SYSTEM AND METHOD AND LINKING INFORMATION TO A VIDEO

(75) Inventors: Eliahu Efrat, Tel-Aviv (IL); Avner Peleg, Ramat-Hasharon (IL); Yossi A. Hermush, Tel-Aviv (IL); Ehud Peleg, Tel-Aviv (IL); Elhanan A. Borenstein, Tel-Aviv (IL)

(73) Assignee: Veon Ltd., Herzliya (IL)

( * ) Notice: Subject to any disclaimer, the term of this patent is extended or adjusted under 35 U.S.C. 154(b) by 0 days.

(21) Appl. No.: 08/882,512

(22) Filed: Jun. 25, 1997

Related U.S. Application Data

(60) Provisional application No. 60/024,466, filed on Jul. 26, 1996.

(51) Int. Cl.[7] .............. G09G 5/00; G06F 3/14
(52) U.S. Cl. ............... 345/723; 345/726; 345/853
(58) Field of Search ................... 345/328, 327, 345/335, 339, 348, 357, 972, 723–726, 853–854; 707/501, 513

(56) References Cited

U.S. PATENT DOCUMENTS

| | | | |
|---|---|---|---|
| 4,305,131 A | 12/1981 | Best | 345/327 |
| 4,360,345 A | 11/1982 | Hon | 434/262 |
| 4,634,386 A | 1/1987 | Tamaki | 434/323 |

(List continued on next page.)

FOREIGN PATENT DOCUMENTS

| | | | |
|---|---|---|---|
| EP | 0 618 526 A2 | 10/1994 | G06F/3/033 |
| EP | 0 756 420 A2 | 1/1997 | H04N/7/00 |
| WO | 96/31047 | 10/1996 | |
| WO | 97/12342 | 4/1997 | G06T/1/00 |
| WO | 97/37497 | 10/1997 | H04N/7/58 |

OTHER PUBLICATIONS

Liu et al. (Multimedia Computing and Systems, 1994, Proceedings of the International Conference, pp. 203–112).*
ASSET–2 Publications entitled "ASSET–2—A Scene Segmenter Establishing Tracking" and "Real–Time Implementation of ASSET–2", U.K. Defence Research Agency, 12 p.
"Multimedia Hypervideo Links for Full Motion Videos", *IBM Technical Disclosure Bulletin, 37*, p. 95 (Apr. 1994).
Burrill, V., et al., "Time–Varying Sensitive Regions in Dynamic Multimedia Objects: A Pragmatic Approach to Content–Based Retrieval from Video", *Information and Software Technology, 36*, 213–223 (1994).
Feinleib, D.A., "AVI Files with Hotspots", Microsoft Developer Network CD–ROM, 14 p. (Jul. 1994).
Smith, S.M., "ASSET–2: Real–Time Motion Segmentation and Object Tracking", DRA Technical Report TR95SMS2, U.K. Defence Research Agency, 7 p.
"Visual Shock Create and Gather", Mitsubushi Electric America, Inc., (1998) http://www.visualshock.com/visualshock/vs/vs–a.htm.
Feinleib, D.A., "AVI Files with Hotspots", Microsoft Network Developers CD–ROM, 1–13 p., (Aug. 16, 1993).
Bässmann, H., et al., In: *Ad Oculos—Digital Image Processing, Student Version 2.0*, International Thomson Publishing, London, p. 170–175 (1995).

(List continued on next page.)

*Primary Examiner*—Sy D. Luu
(74) *Attorney, Agent, or Firm*—Edward Blocker

(57) ABSTRACT

A system and method are provided for linking information to and accessing information from a video. A hotspot can be defined in a frame of a video. The hotspot can be tracked in other frames of the video. Also, the hotspot can be linked to a target. When the video is played, the hotspot can be actuated and the corresponding target executed.

65 Claims, 16 Drawing Sheets

U.S. PATENT DOCUMENTS

| | | | |
|---|---|---|---|
| 4,712,180 A | 12/1987 | Fujiyama et al. | 434/323 |
| 4,798,543 A | 1/1989 | Spiece | 434/323 |
| 4,905,163 A | 2/1990 | Garber et al. | 706/55 |
| 5,065,345 A | 11/1991 | Knowles et al. | 345/302 |
| 5,101,364 A | 3/1992 | Davenport et al. | 345/328 |
| 5,106,097 A | 4/1992 | Levine | 273/237 |
| 5,109,482 A | 4/1992 | Bohrman | 345/328 |
| 5,204,947 A | 4/1993 | Bernstein et al. | 345/357 |
| 5,250,747 A | 10/1993 | Tsumura | 84/645 |
| 5,267,329 A | 11/1993 | Ulich et al. | 382/103 |
| 5,267,865 A | 12/1993 | Lee et al. | 434/350 |
| 5,297,249 A | 3/1994 | Bernstein et al. | 345/356 |
| 5,319,455 A | 6/1994 | Hoarty et al. | 725/34 |
| 5,355,472 A | 10/1994 | Lewis | 707/101 |
| 5,377,997 A | 1/1995 | Wilden et al. | 463/43 |
| 5,393,073 A | 2/1995 | Best | 463/35 |
| 5,395,123 A | 3/1995 | Kondo | 273/454 |
| 5,397,853 A | 3/1995 | Koguchi | 434/307 |
| 5,408,659 A | 4/1995 | Cavendish et al. | 707/1 |
| 5,442,390 A | 8/1995 | Hooper et al. | 725/90 |
| 5,446,891 A | 8/1995 | Kaplan et al. | 707/2 |
| 5,447,438 A | 9/1995 | Watanabe et al. | 434/307 |
| 5,453,779 A | 9/1995 | Dan et al. | 725/88 |
| 5,461,415 A | 10/1995 | Wolf et al. | 725/88 |
| 5,506,984 A | 4/1996 | Miller | 707/10 |
| 5,513,991 A | 5/1996 | Reynolds et al. | 434/81 |
| 5,528,513 A | 6/1996 | Vaitzblit et al. | 709/103 |
| 5,539,871 A | 7/1996 | Gibson | 707/501 |
| 5,572,643 A | 11/1996 | Judson et al. | 709/218 |
| 5,590,262 A | 12/1996 | Isadore-Barreca | 395/806 |
| 5,596,695 A | 1/1997 | Hamada et al. | 345/333 |
| 5,596,705 A | 1/1997 | Reimer et al. | 345/326 |
| 5,608,448 A | 3/1997 | Smoral et al. | 725/92 |
| 5,613,057 A | 3/1997 | Caravel | 345/302 |
| 5,613,909 A | 3/1997 | Stelovsky | 463/1 |
| 5,615,325 A | 3/1997 | Peden | 345/326 |
| 5,617,565 A | 4/1997 | Augenbraun et al. | 707/4 |
| 5,621,871 A | 4/1997 | Jaremko et al. | 345/441 |
| 5,659,539 A | 8/1997 | Porter et al. | 709/231 |
| 5,659,692 A | 8/1997 | Poggio et al. | 345/330 |
| 5,659,793 A | 8/1997 | Escobar et al. | 345/302 |
| 5,692,212 A | 11/1997 | Roach | 395/806 |
| 5,708,845 A | 1/1998 | Wistendahl et al. | 395/806 |
| 5,838,906 A * | 11/1998 | Doyle et al. | 709/202 |
| 5,966,121 A * | 10/1999 | Hubbell et al. | 345/328 |

OTHER PUBLICATIONS

Foley, J.D., et al., In: *Computer Graphics—Principles and Practice, 2nd Edition*, Addison–Wesley Publishing Co., New York, p. 980–983 (Nov. 1991).

Tekalp, A.M., In: *Digital Video Processing*, Prentice Hall PTR, Upper Saddle River, NJ, p. 101–106 (1995).

Zhang, H.J., et al., "Video Parsing, Retrieval and Browsing: An Integrated and Content–Based Solution", *Proceedings of ACM Multimedia '95*, San Francisco, CA, 15–24 (Nov. 5–9, 1995).

Ginige, A., et al., "Hypermedia Authoring", *IEEE Multimedia*, 2, 24–35 (1995).

* cited by examiner

SYSTEM AND METHOD AND LINKING INFORMATION TO A VIDEO

RELATED APPLICATION

This application claims the benefit of U.S. Provisional Application No. 60/024,466, filed Jul. 26, 1996.

FIELD OF THE INVENTION

The present invention relates generally to electronic technology, and more specifically to interactive multimedia technology.

BACKGROUND OF THE INVENTION

Computers are capable of communicating information to humans in many formats, including text, graphics, sound and video. A multimedia presentation on a computer combines such formats to present information more coherently so that it is better perceived by humans.

Information on computers can be linked. For example, using "hypertext," the existence of additional and related information that is associated with a selected portion of text may be indicated by highlighting or underlining the selected text. The information associated with such selected text may be accessed, for example, utilizing a pointer device, such as a mouse. A mouse button may be actuated when a pointer is positioned on the highlighted text. After selecting the highlighted text in such a manner, the user is presented with additional relevant information.

However, text is not always the most desirable means of conveying information to humans. Some information is best illustrated with video. However, unlike text, there has not been an effective means for implementing links in a video to access information.

SUMMARY OF THE INVENTION

The present invention solves the above-mentioned problems in the art and other problems which will be understood by those skilled in the art upon reading and understanding the present specification. The present invention is a system and method for linking information to and accessing information from a video. The method for linking information includes the steps of defining a hotspot in a frame of video and linking the hotspot to a target. In one embodiment, the hotspot is tracked in other frames, such as later or earlier frames, of the video.

The method for accessing information includes the steps of displaying the video, and executing a target in the video. In another embodiment, a hotspot may be actuated. In yet another embodiment, the video may be displayed on a television.

The apparatuses for linking information to a video may include a computer program product or a computer system. The computer program product may include a defining process enabling a processor to define a hotspot in a frame of a video. Also, a linking process may enable the processor to link the hotspot to a target. In another embodiment, the computer program product may include a tracking process enabling the processor to track the hotspot in other frames of the video.

The apparatus for accessing information from a video may also include a computer program product or a computer system. The computer program product may include a displaying process enabling a processor to display a video. An executing process enables the processor to execute a target linked to the hotspot. In another embodiment, an actuating process may enable the processor to actuate a hotspot in the video. The computer system, may include, in addition to the features of the computer program product, a processor operatively coupled to a memory.

The present invention may include a television including a receiver operatively coupled to a computer, described above. The computer may further comprise a displaying process to display video on a television, and an executing process to execute a target in the video. The present invention may also include a video source operatively coupled to a computer, described above. The video source may further comprise a displaying process to display a video, and an executing process to execute a target.

It is a benefit of the present invention that it permits creating and displaying hyperlinks, or hotspots, in select regions of interest in frames of a video. Further features and advantages of the present invention, as well as the structure and operation of various embodiments of the present invention, are described in detail below with reference to the accompanying drawings.

DETAILED DESCRIPTION OF THE EMBODIMENTS

Figure 1A:
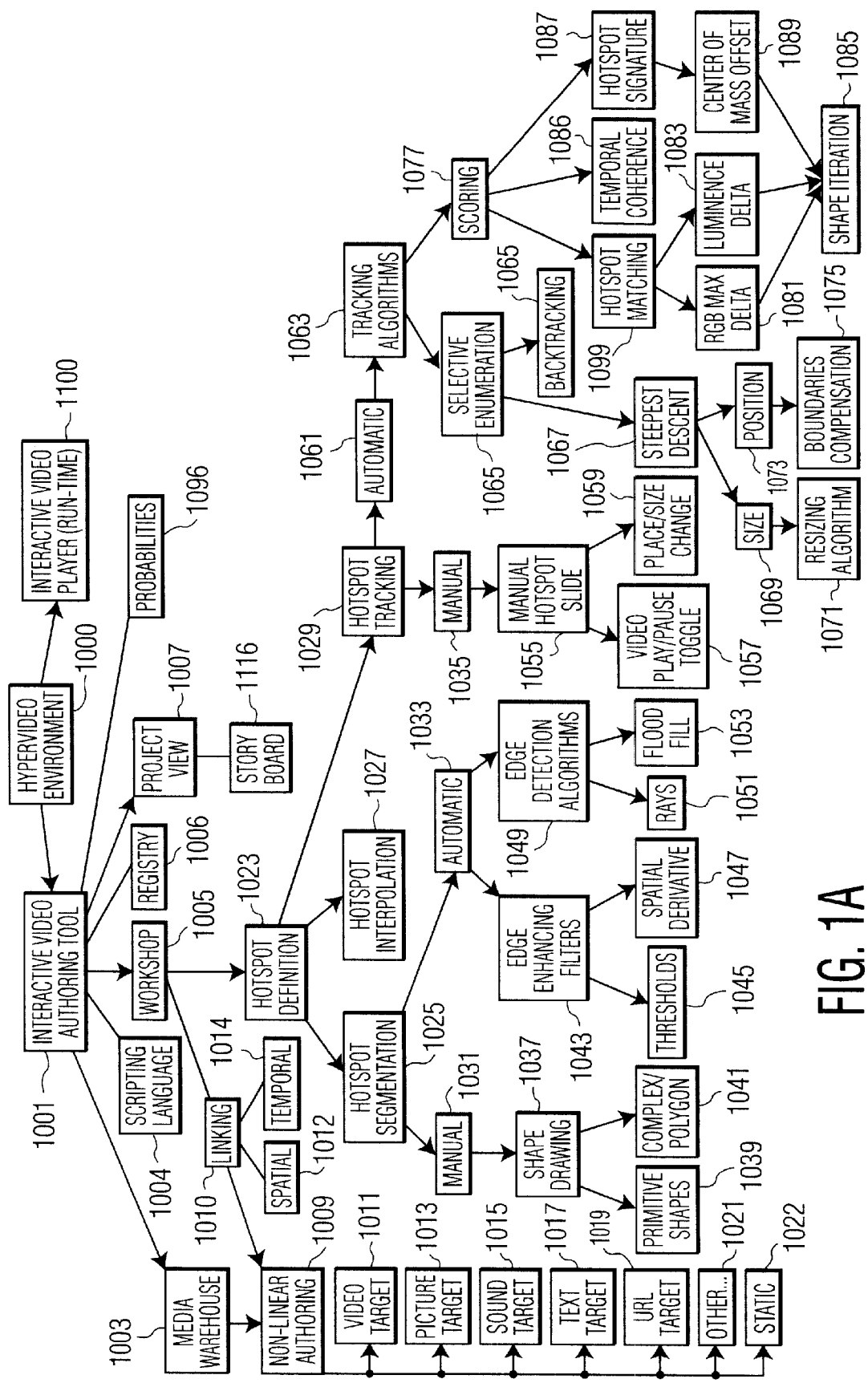
FIG. 1A illustrates an exemplary hypervideo environment, including a hypervideo authoring tool.

In the following detailed description of the preferred embodiments, reference is made to the accompanying drawings which form a part hereof, and in which is shown by way of illustration specific preferred embodiments in which the invention may be practiced. These embodiments are described in sufficient detail to enable persons skilled in the art to practice the invention, and it is to be understood that other embodiments may be utilized and that logical, mechanical and electrical changes may be made without departing from the scope of the present invention. The following detailed description is, therefore, not to be taken in a limiting sense, and the scope of the present invention is defined only by the appended claims.

TABLE OF CONTENTS 1.0 Introduction
2.0 Software Implementation
   2.1 Authoring Tool
      2.11 The Menu Bar
      2.12 Main Tool Bar
      2.13 Media Warehouse
      2.14 The Workshop
         2.141 Hotspot Definition
         2.142 Hotspot Tracking
         2.143 Targets
      2.15 Project View
   2.2 Run-Time Module
      2.21 Run-Time Module Commands
      2.22 Run-Time Module Design
3.0 Conclusion 1.0 Introduction The present invention is a method and apparatus for linking information to and accessing information from a video. The video may be hypervideo. Hypervideo is video with one or more regions of interest, where each region of interest is linked to one or more targets. Hypervideo permits a user to interact with video. A user can create hypervideo which is non-linear. As a result, for example, the user can navigate the hypervideo from a base target, such as, but not limited to, a video, to other target(s), such as, but not limited to, HTML files or other videos. The other targets may be executed, or activated, simultaneously, sequentially, or a combination thereof. The parent target can be halted, for example when paused or closed, or keep playing.

The present invention comprises a method and apparatus for creating and playing hypervideo. The present invention may be implemented with computer programs. The program that creates hypervideo is known as an authoring tool, or an editor. The program that enables a computer to display hypervideo is known as the run-time module.

The authoring tool may be used to define a hotspot, or an object, in a region of interest in one or more frames of a video, and then track the hotspot in later frames, for example. The hotspot may also be defined in a picture, including a bitmap. Any subsequent discussion of bitmaps may also be applicable to other picture formats, which are subsequently described. Hotspots can be alternatively tracked manually and automatically. With the authoring tool, the hotspot may be linked to a target, for example, but not limited to, text, audio, or a second video. Targets are further described and exemplified below. Thus, for example, when playing the hypervideo with the run-time module, a user can place a pointer over the hotspot in the video with a mouse. When the pointer is placed over the hotspot, the cursor may change. Then, by actuating a mouse button, the user may launch, or execute, the target. When the mouse button is actuated when the pointer is over the hotspot, the cursor may change again. Multiple targets can be linked to a hotspot.

Because of its ease of use, hypervideo can be used for a wide variety of applications, including, but not limited to, interactive television, games, tourism and home shopping.

2.0 Software Implementation

Figure 1B:
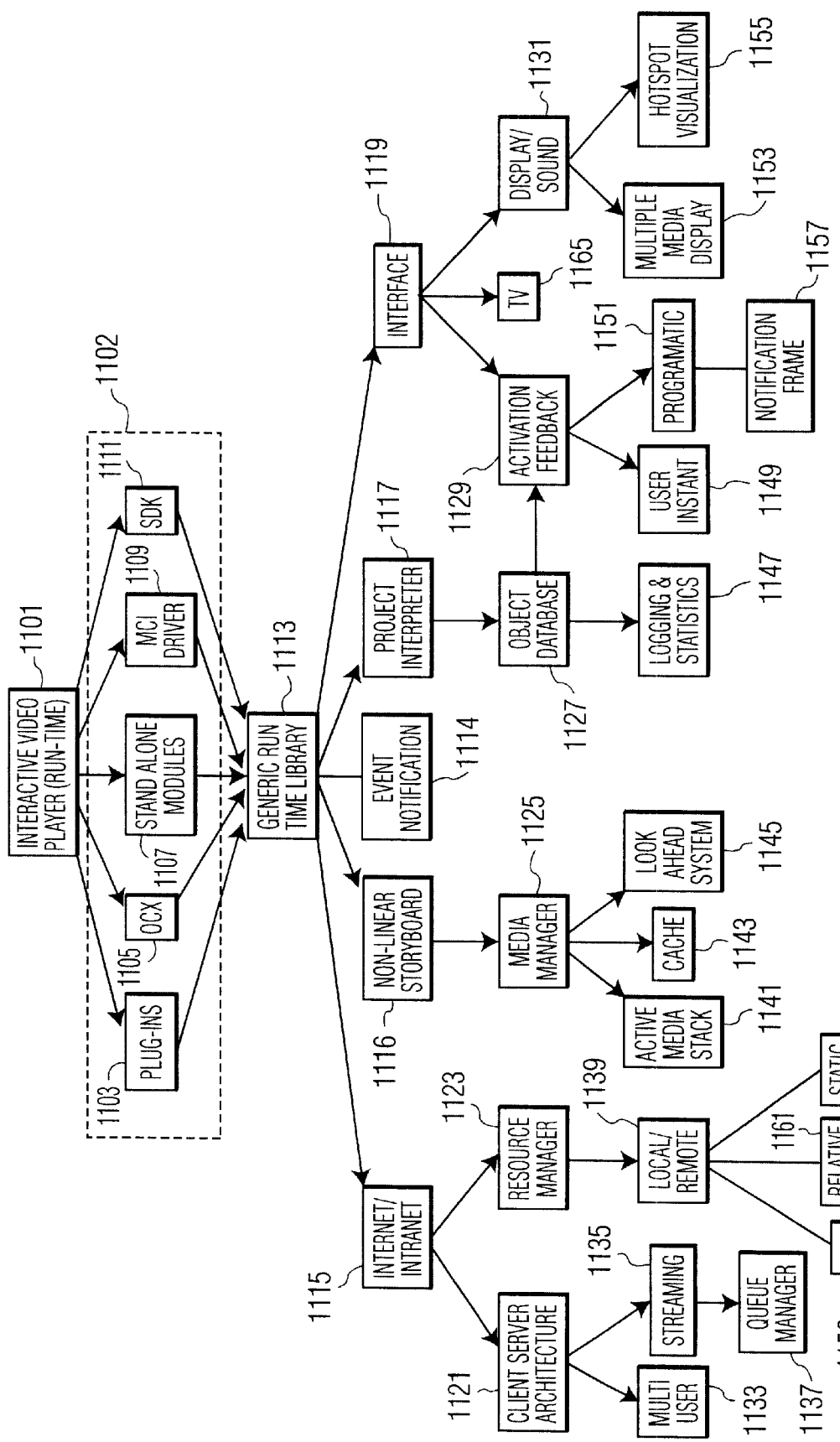
FIG. 1B illustrates an exemplary hypervideo run-time module.

Exemplary structures of computer programs for authoring and playing hypervideo are respectively shown in FIGS. 1A and 1B. The computer programs comprise a hypervideo environment 1000 including an authoring tool 1001 and a run-time module 1101. The computer programs may be implemented with object-oriented software, as exemplified below. The computer programs can be executed on a computer, for example, using the Windows 95 operating system by Microsoft Corporation (Redmond, Washington). Thus, the programs, specifically the authoring tool 1001, may have the look and feel of Windows 95. However, the present invention may be implemented, for example, in other systems, such as, but not limited to, televisions, described below. The present invention may also be implemented with other operating systems.

Figure 1C:
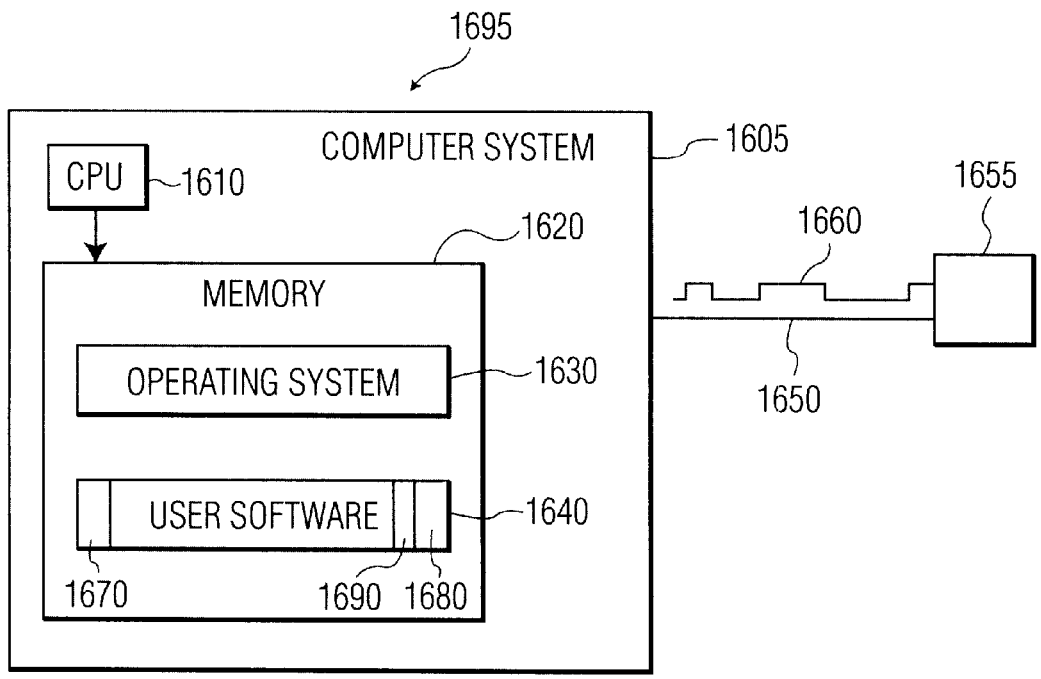
FIG. 1C illustrates an exemplary block diagram of one embodiment of a computer system.

FIG. 1C illustrates an exemplary computer system 1605 in which one or more programs or sub-programs of the hypervideo environment 1000 may reside and be executed. The computer system 1605 may be any processing system for executing one or more programs or sub-programs of the hypervideo environment 1000, including, but not limited to, personal computers and interactive televisions.

The computer 1605 may include a central processing unit 1610 and memory 1620. The processing unit 1610 may be, but is not limited to, a Pentium microprocessor by Intel Corporation (Santa Clara, Calif.). The memory 1620 can be random access memory, disk storage, CD-ROM storage, digital video, or versitile, disk (DVD) 1159, another type of memory or combinations thereof. The memory may be a video source. Within the memory 1620, the computer system 1605 has access to its operating system 1630 and user software 1640. The user software 1640 can include the authoring tool 1001, the run-time module 1101, stand-alone modules 1107, multimedia control interface (MCI) driver 1109, software development kit (SDK) 1111, plug-ins 1103, and the hypervideo project file 1670.

Figure 1D:
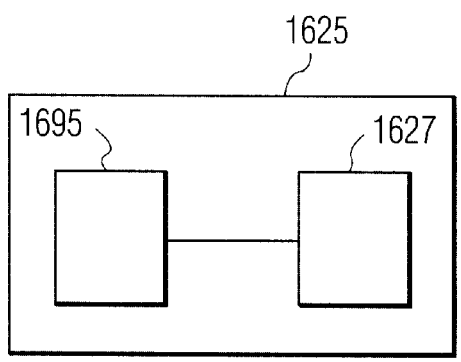
FIG. 1D exemplifies a computer implemented as an integrated circuit.
Figure 1E:
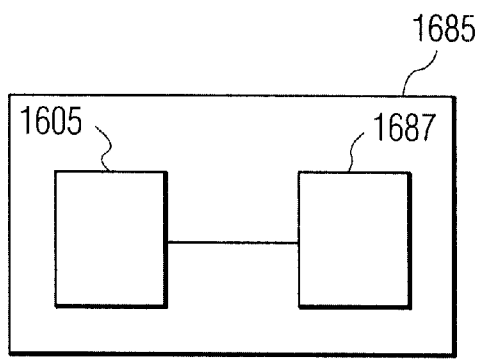
FIG. 1E illustrates an exemplary television.

In one embodiment, the computer 1605, or portions thereof, may be implemented in an integrated circuit. For example, as illustrated in FIG. 1D, the integrated circuit 1695 can be implemented in a DVD apparatus 1625 including a reader 1627 for reading information from a DVD, operatively coupled to the integrated circuit 1695. In another embodiment, the computer 1605, or portions thereof, may be implemented in a television 1685, as illustrated in FIG. 1E, for receiving hypervideo television signals. The television 1685 also includes a receiver 1687 which may be coupled to the computer 1605 or portions thereof. The computer may permit displaying a hypervideo, for example, on the television.

The hypervideo project file 1670 is a database used by both the authoring tool 1001 and the run-time module 1101. The extension of hypervideo database files may be *.OBV. The project file 1670 may be encrypted creating encryption keys using functions, such as srand and rand. The authoring tool 1001 and run-time module 1101 may include components that detect the authoring tool 1001 version used to create a project file 1670 and thus can read the project file 1670. Thus, the authoring tool 1001 and run-time module 1101 may be upgraded without project files created by older versions of the authoring tool becoming obsolete or unusable. The authoring tool 1001 and the run-time module 1101 will now be successively described.

2.1 Authoring Tool

The authoring tool 1001 may be used to define hotspots in media, such as video, and link 1010 the hotspots to targets. Hotspot definition, for example, may be performed substantially in real time. The authoring tool 1001 comprises three interconnected sub-programs, the media warehouse 1003, the workshop 1005, and the project view 1007. Each sub-program may be represented by a window on the display of a computer. Furthermore, apparatuses and methods described below for the authoring tool 1001 may also be used in the run-time module 1101, or vice versa. The authoring tool 1001 may plug into other editing tools, such as Adobe Premier by Adobe Systems Incorporated (San Jose, Calif.).

The authoring tool 1001 may include a registry 1006. The registry 1006 permits each user to save their own authoring tool settings, including the placement of windows. The registry 1006, for example, may be implemented with the registry system of Windows 95 or Windows NT by Microsoft.

A user may utilize the authoring tool 1001 to perform the following tasks. The user may import media files 1680 into the media warehouse 1003. Each imported media file 1680 may result in a new media element 1690 being created in the media warehouse 1003. Each media element 1690 may include a reference, which may be a pointer, to media files 1680 which could be video, bitmap, sound, or text. The pointer may also be directed to non-media, such as a uniform resource locator (URL) or an executable file, which are considered to be media with respect to media files 1680 and media elements 1690 in this document. One or more media files 1680, generally video and bitmap files, may be selected to form a base target. Then, these video and bitmap files may be placed in the workshop 1005 so that hotspots may be defined within them. After the hotspots are defined, each hotspot may be linked 1010 to one or more other targets, which are media elements 1690. The base target and other targets form a hypervideo story board 1116. The aforementioned techniques may be described as nonlinear authoring 1009.

The hypervideo data created by manipulating the different sub-programs of the authoring tool is stored in a project file 1670. The hypervideo data may include, for example, but is not limited to, data pertaining to media elements 1690, hotspots, targets, and cursors. The project file 1670 can be exported to video servers, for example, that provide video on a network 1650, such as the Internet or an Intranet. Alternatively, it is envisioned that hypervideo data may be exported by the authoring tool 1101, for example, into a media file 1680 or into a data stream 1660 that is parallel with streams of video and audio information. For example, the data may be stored in enhanced video files. Enhanced video files include hypervideo information in the video file. One form of an enhanced video file, such as an AVI file, may only include hotspot information. Enhanced video files may also be recognized in the hypervideo environment 1000.

The authoring tool 1005 includes a graphical user interface (GUI) to facilitate authoring hypervideos. However, a scripting language 1004 can also be used to author hypervideos. The GUI includes the following components:

A Menu bar;

A Media Warehouse window—which contains the media elements 1690 including the references to the media files 1680 in a hypervideo project;

A Workshop window—in which the user defines the hotspots, and links the hotspots to targets. From the Workshop window the user can also open the Preview, or Cinema, window to review the hypervideo project at any time.

A Tools window—which holds tools with which the user may define the hotspots and link 1010 the hotspots to targets;

A Preview window—with which the user may preview the hypervideo project; and

A Project View window—in which the user can view and may also edit the logical flow of a hypervideo project.

The GUI will be subsequently described in further detail.

2.11 The Menu Bar

The authoring tool may include a menu bar to manipulate the Media Warehouse, Workshop and Project View windows. The menu bar may include the following commands:

| Command | Description |
| --- | --- |
| File | Handles file commands. The file entity is either a hypervideo project file 1670 or a media file 1680. |
| New | Creates a new project file 1670. |
| Open . . . | Opens an existing project file 1670. May also preview the corresponding hypervideo in a project view window. |
| Save | Saves the project file 1670 with its current name. |
| Save As . . . | Saves the project file 1670 with a new name. |
| Revert | Retrieves the last saved version of the project file 1670. This operation closes the current file and opens its previously saved version. |
| Project Settings | |
| Base Target | Subsequently described. |
| Default Cursors | Subsequently described. |
| Coordinate Resolution | Subsequently described. |
| Import Media File . . . | Imports a media file 1680 or folder. This option lets the user select a directory and display all media files 1680 in that directory. The user can select one, several or all media files 1680 in the specified directory. See FIG. 2. The user may drag and drop files or folders from an open import media file dialog into the Media Warehouse window. |
| Import From Project . . . | Imports one or several media elements 1690 from a selected, existing project file 1670. This option lets the user utilize previously defined hotspots in the media elements 1690. The media elements 1690 are associated with the selected project. An imported media element 1690 includes all defined hotspots within the media element 1690. This command saves the user time when defining hotspots. See FIG. 2. |
| Import Cursor | Imports cursors to a hypervideo project. May be alternatively accessed by the browse command, described later. All cursors that are imported to the hypervideo project can be displayed in a cursor window. The cursor window can be a simple list view which enables the user to import new cursors into the project. When selecting a cursor for a hotspot, the user can drag a cursor from the cursor window to the Hotspot Properties Sheet. Animated cursors may be shown in their animated form in the cursor window. The cursor data need not be stored in the project file 1670. |
| Preview | Runs the hypervideo project from its beginning. Also may be initiated by the preview button in the Workshop window. |
| Print | Prints reports of the hypervideo project. The following reports can be printed: Project Scheme - Illustrates the story board 1116 created in the authoring tool 1001. Project Probabilities 1096 - Calculates and prints a report of the probability of reaching each branch in the hypervideo. Project Listing - Prints a list of all hotspots in the form of an identifier (ID) (i.e. text) |
| Print Setup . . . | Sets up a printer. Standard dialog for setting up the print environment. |
| Exit | Exits the program. |
| Edit | |
| Undo | Undoes the last action. |

-continued

| Command | Description |
|---|---|
| Cut | Cuts the selected item and places it in the clipboard. This action may be context related. Thus, when the user selects this command, the action performed by the authoring tool 1001 is related to the item that is selected (i.e., hotspot or media element 1690). The Cut command may be a multiple selection command, as described below. |
| Copy | Copies the selected item in the clipboard. This action is context related. This means that when this command is used, the action performed by the authoring tool 1001 is related to the item that is selected (i.e., hotspot or media element 1690). The Copy command is a multiple selection command. |
| Paste | Pastes the clipboard contents into the specified location. See the Cut command about context relation. |
| Delete Del | Deletes the selected item whether from the Media Warehouse window or the Workshop window. |
| Select All | Select all items. Applicable both to the Workshop and the Media Warehouse windows. |
| Validate | Validates a hypervideo project by searching for dead locks, errors, and minor authoring mistakes. This operation may generate a report that can be printed and reviewed by the user. Different levels of warnings are permitted. |
| Media | Handles commands for manipulating the Media Warehouse window. |
| Partial View | View of the media elements 1690 without their details. Just the name of the file and a thumbnail are displayed. |
| Detailed View | View of the media elements 1690 with all details and a header for each of the categories. The user can actuate a header to sort the media elements 1690 according to the selected category. |
| Sort by | Sort the media elements 1690 in the Media Warehouse window by a specified category. |
| View only | View only a certain type of media file 1680 (e.g., video, sound, bitmap, etc.). |
| Workshop | Manipulates the Workshop window. |
| Preview Mode | Enters preview mode in which the hypervideo project plays and permits navigation through the hypervideo with hotspots. |
| Play/Pause | Plays and Pauses the video displayed in the Workshop window. These commands appear depending on the state of the Workshop window. If Workshop window is playing a video, the command shows a Pause button. However, if the video is paused, the Workshop window shows a Play button. |
| In | Marks a currently displayed frame as default IN for the media, such as video. |
| Out | Marks the currently displayed frame as default OUT for the media, such as video. |
| Home | Goes to the IN frame of the video in the Workshop window. |
| Define New Hotspot | Defines a hotspot of the selected shape (e.g., Elliptic, Rectangular, Triangular, or Polygon). |
| Set Target | Enters the Set Target mode, as described below. |
| Options | Authoring Tool options. |
| Settings | May pop up a properties sheet with settings for all windows and the hypervideo project. The properties sheet may be used to define run-time details, including the size and position of the Preview window, as well as assign the base targets of the project. The base targets may play when the project is started. To define base targets, the user may drag video media elements, for example, from the Media Warehouse 1003 to the Targets, or Links, page of the properties sheet. Also, the properties sheet may permit controlling automatic tracking, hotspot colors and patterns (typically crosshatched), maximum number of polygon vertices and other workshop parameters. A hotspot may have three states: Selected, Deselected and Interpolated. The user can choose colors and patterns for each state. The maximum number of polygon vertices limits the number of vertices that may be used to define a hotspot in a freehand mode. |
| Window | Controls the windows of the authoring tool 1001. |
| Media | Makes the Media Warehouse window appear. |
| Workshop | Makes the Workshop window appear. |
| Tools | Makes the Tools window appear. |
| Close | Closes the selected window. |
| Close All | Closes all windows. |

Command Dialogs

Selection of specific menu bar commands may launch dialogs for importing media files. Specifically, dialogs are launched when placing media elements 1690 into the media warehouse 1003 with the import media file and import from project commands. These dialogs are described below.

Import Media File

Figure 2:
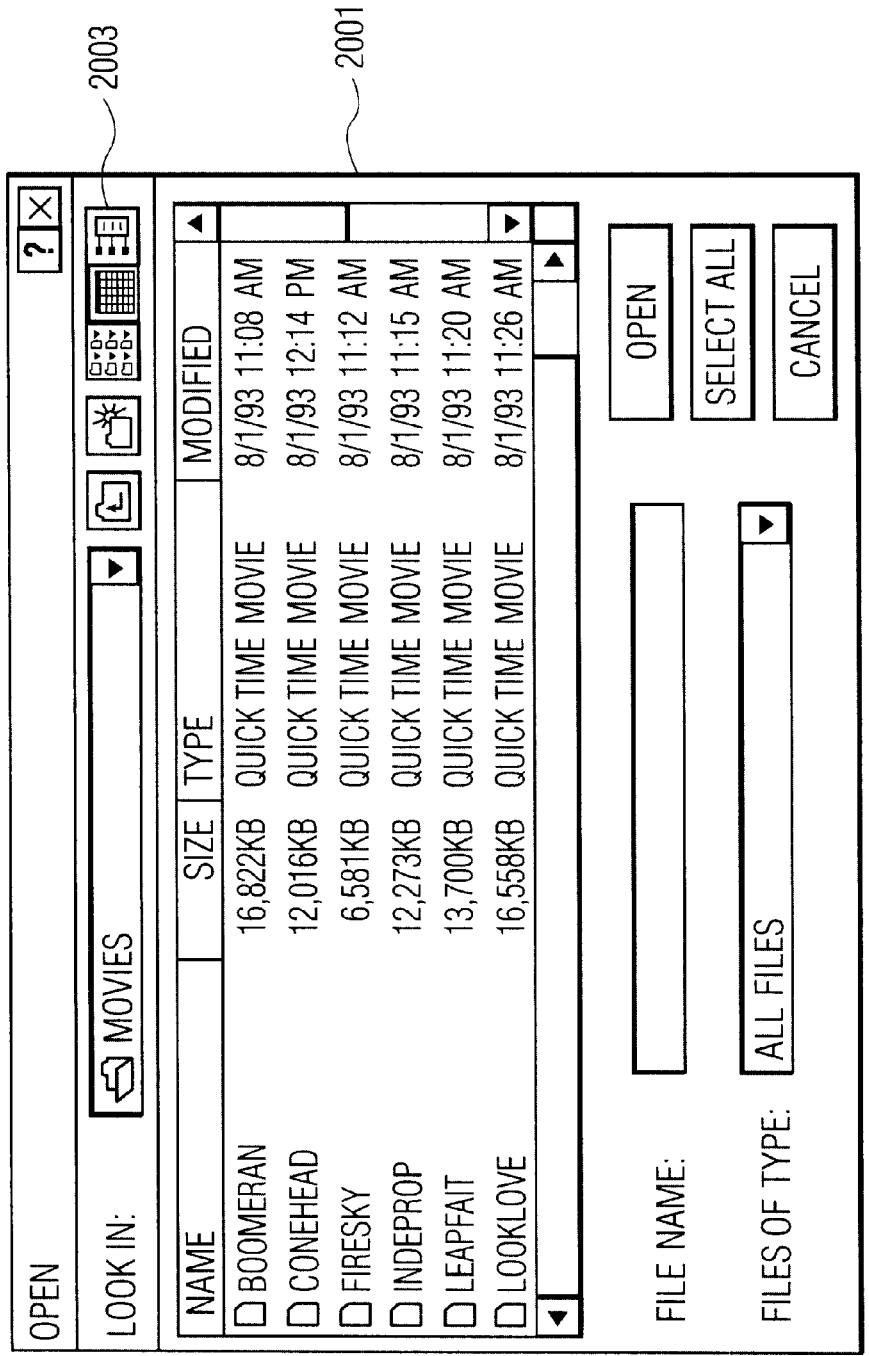
FIG. 2 illustrates an exemplary Import Media File Dialog.

In order to start building a hypervideo project, the user may import media files 1680 into the media warehouse 1003. FIG. 2 is an illustration of an exemplary Import Media File dialog 2001. The Import Media File dialog 2001 is launched upon the selection of the import media file command. The Import Media File dialog 2001 permits the user to view media files 1680 and import corresponding media elements 1690 into the media warehouse 1003. The user can import media elements 1690 in the following ways:

1. Import a media element 1690 corresponding to a media file into the media warehouse 1003.
2. Import media elements 1690 corresponding to media files 1680 in a directory or file folder into the media warehouse 1003.

This dialog 2001 may use a multiple selection list. The Import Media File dialog 2001 may permit several files or an entire directory to be selected.

When actuating a Preview button 2003, the dialog may show a preview of the selected file, with the ability to execute, for example, a video, audio or bitmap media. Media files 1680 and folders may also be dragged and dropped, for example, from Explorer by Microsoft and other file managers.

Import From Project

Figure 3:
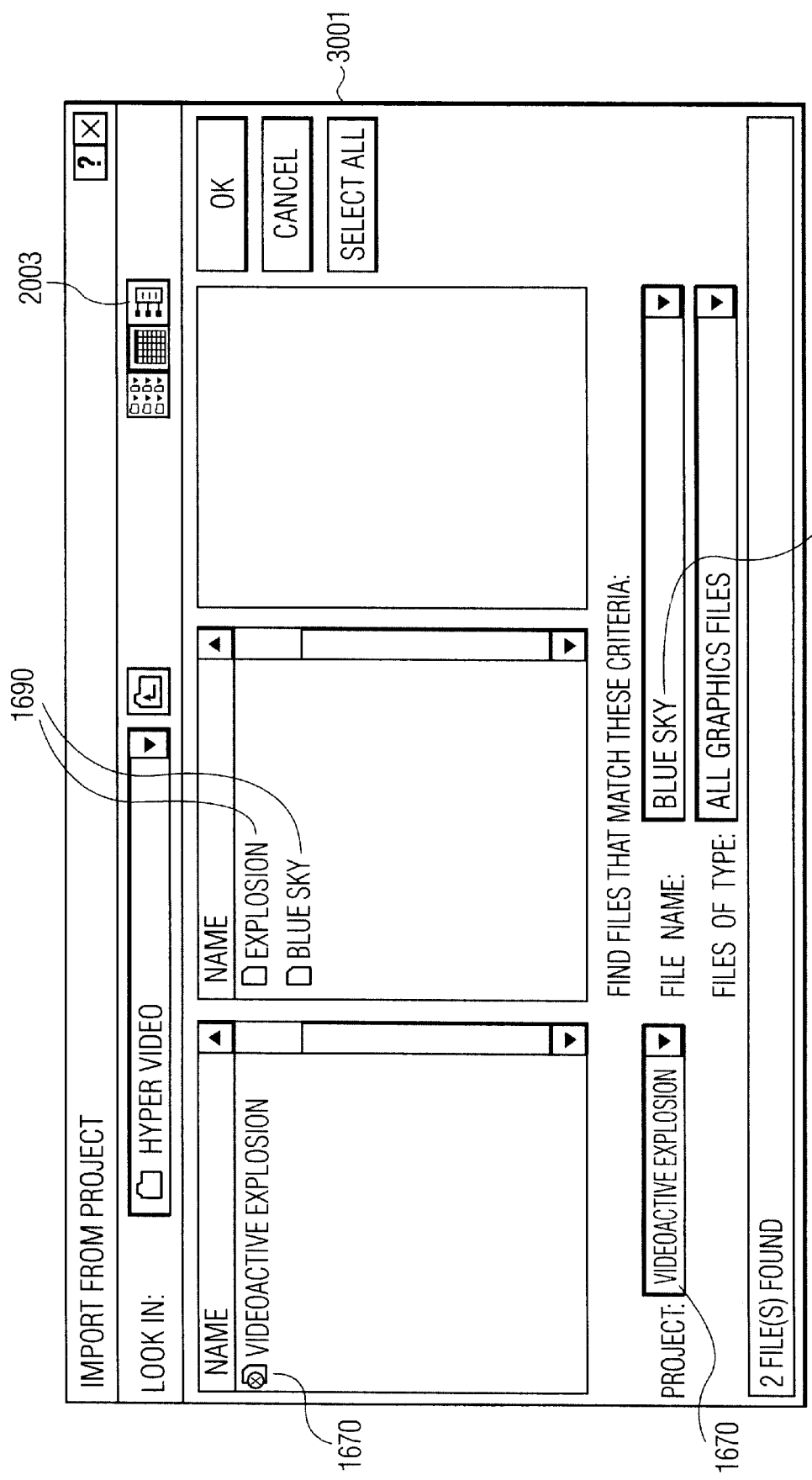
FIG. 3 illustrates an exemplary Import From Project Dialog.

FIG. 3 is an illustration of an exemplary Import From Project dialog 3001. The Import From Project dialog 3001 permits the user to view and import media elements 1690 from a hypervideo project file 1670 into the media warehouse 1003. A preview window may be opened to display both the hypervideo project and corresponding media files 1680 by actuating the Preview button. In the preview window, hotspots may be shown. The Import From Project dialog 3001 includes features of the Import Media File dialog 2001 described above.

2.12 Main Tool Bar

The hypervideo authoring tool 1001 may have a main tool bar. The main tool bar may float and can be closed. The main tool bar functions may include: New, Open, Save, Import Media File, Print, Preview, Copy, Cut, Paste, Media view formats, Options|getting, Window Tiles, and Help.

2.13 Media Warehouse

The Media Warehouse 1003 may contain media elements 1690 that are used to form a hypervideo project. Each media element 1690 may include a reference to a media file 1680 which could be video, bitmap, sound, or text. The pointer may also be directed to non-media, such as a uniform resource locator (URL), a hypertext markup language (HTML) file, or an executable file, as described above. For example, the URL may point to HTML file. The video and bitmap media elements may include hotspots that are linked 1010 to targets, such as other media files 1680.

The Media Warehouse Window

The Media Warehouse 1003 may be represented by a window on a display on a computer or television, for example. The Media Warehouse window displays a thumbnail of the contents of a media file 1680 pointed to by a media element 1690. The Media Warehouse window may permit the user to view the media elements 1690 in one of several views, including:

1. Symbolic view—in which, for example, only thumbnail illustrations of the contents of media files 1680, referenced by corresponding media elements 1690, are displayed; and
2. Detailed view—in which detailed media element 1690 information is displayed.

Figure 4:
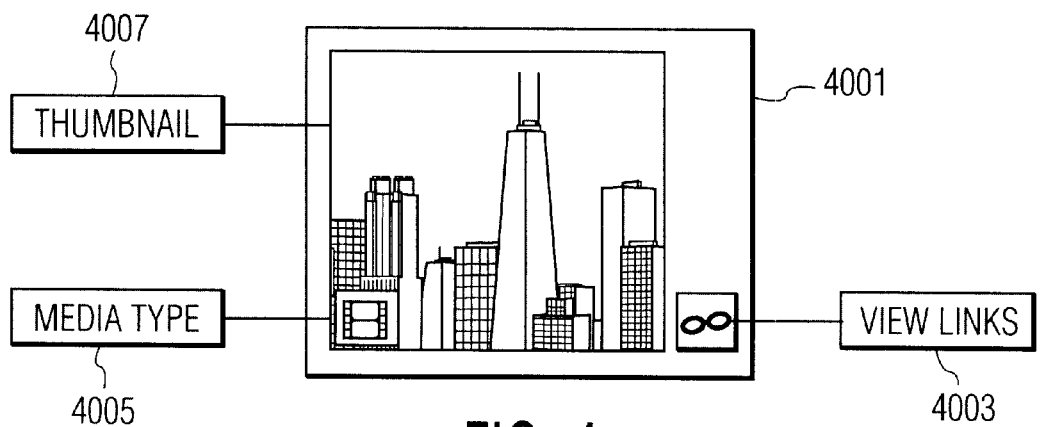
FIG. 4 illustrates an exemplary Media Warehouse Window Icon.

Each media element 1690 has its own identification (ID) section in the Media Warehouse window. As shown in FIG. 4, the media element's ID section, or icon, 4001, may consist of:

A thumbnail illustration 4007 of the contents of a media file 1680 pointed to by a media element 1690. The thumbnail illustration 4007 is a picture in the case of bitmap or video media files, and a waveform in the case of sound media files. For video media, the picture may show one frame, presumably the first frame, of the video media file.

An icon specifying the data type of the media file 4005 for any view that does not require a specification of the content of the media file 1680, but rather the data type and name of the media element 1690.

Textual data that describes the media file 1680.

In the Media Warehouse window, if a media element 1690 includes at least one target, the right side of the media element icon 4001 may be decorated by a token 4003, or link button. This token 4003 indicates that the media element 1690 is linked 1010 to a target, such as a media file 1680. The token 4003 may also be a button. Upon actuating the mouse button when a pointer. is over the token 4003, the user may be presented with a pop-up window that shows all targets that are linked 1010 to the selected media element 1690. The user may drag the pointer over a target and actuate the mouse button. Then, the selected target may scroll up or down to the top left position in the Media Warehouse window. The pop-up window may then show any targets linked 1010 to the selected target. This method provides an easy and intuitive method to navigate through the files in the Media Warehouse window. The linked target pop-up window may be closed by actuating the mouse button when the pointer is over the token 4003 of the selected media element. FIG. 4 shows an exemplary media element icon 4001 for a video in the Media Warehouse window.

Alternatively, the token 4003 may be implemented as an icon, and not a button. As a result, the Media Warehouse window can be implemented as a common list view control.

The authoring tool 1001 can show targets linked 1010 to hotspots in a manner that is more easily understood by a user. Hotspots, rather than links 1010, can be viewed by manipulating the media element icon 4001. For example, when the pointer is positioned over a media element icon 4001 and the right mouse button is actuated, a menu of hotspots, rather than linked targets in the selected media element, is displayed. Then, the linked targets of each hotspot may be displayed. These techniques will subsequently be described.

The authoring tool 1001 supports the 8, 16, 24, and 32 bit color modes. Thus, thumbnails and previews may be displayed in the color mode of the corresponding media file 1680, or alternatively, in the 24 bit color mode.

Relative Path

The authoring tool 1001 may create a project file 1670 that defines the paths of media files 1680, corresponding to media elements 1690 in a hypervideo, relative to the path of the project file 1670. The common portion of the paths of the project file 1670 and media file 1680 is referred to as the static path 1163. The unique portion of the media file 1680 path is referred to as the relative path 1161. The project file 1670 and media files 1680 may be stored locally or remotely 1139. For example, the project file 1670 and media files 1680 may be moved to a different memory unit, such as disk drive, computer, or computer network, while keeping the relative path 1163 the same, then the project file 1670 does not require editing for the hypervideo to be performed. This will enable altering the drive letter or even the base path from which the hypervideo project is executed.

Tool Tips

A tool tip can be activated and display information about a media element 1690 when a pointer is positioned over a media element icon 4001 in the Media Warehouse window. The tool tip, for example, may show the full or relative path 1161 of the corresponding media file 1680. The tool tip may include other information, such as the type, and logical and physical size of the corresponding media file 1680.

Media Warehouse Window Controls

The Media Warehouse window may be implemented using a custom list view control from the Microsoft Windows 95 common controls. The list view may show the media elements 1690 in different views (i.e., with details or icons), and permits user manipulations of the lists, such as sorting and reordering. Each media element 1690 of the Media Warehouse window list corresponds to a media file 1680, such as a bitmap. The Media Warehouse window list is associated with an image list control that includes a thumbnail illustration 4007 and a description of the type of the media file 1680. The text of the Media Warehouse window list describes file parameters and are displayed to the user in a detailed view.

The Media Warehouse window can be manipulated in the following ways. Using the list view, the user can, for example:

Resize the list to any size, and create a column like list or a scattered list.

Change the order of the media elements 1690 by dragging and dropping media element icons 4001 corresponding to the media elements 1690, inside the list.

In the detailed view, sort media elements 1690 by category, including media file 1680 type and size. Sorting may be performed by actuating the mouse button when the pointer is over the desired list view header.

Actuate the alternate mouse button to obtain a list of all targets linked 1010 to, or all hotspots in, a specific media file 1680. By selecting a specific target, for example, the user can access the corresponding media element 1690 in the list.

Double click the mouse button when the pointer is over a media element 1690 to preview the corresponding media file 1680. This option may also be activated with the alternate mouse button.

Drag and drop media elements 1690 into other windows of the authoring tool 1001, such as the Workshop window. For example, when a media element icon 4001 is dropped into the Workshop window, the respective media file 1680 is opened and, for example for a video, its first frame is displayed.

The lists of the Media Warehouse window may support full multiselect operation for the delete and move functions.

Alternate Mouse Button

The alternate mouse button can be actuated to perform the following functions, depending on the media file 1680 type of the media element 1690 that is selected.

Preview—open a viewer for that media file 1680 type. Videos that are linked 1010 may not display any hypervideo capabilities in the viewer.

Send to Workshop—The project file 1670 will be opened in the Workshop window (see subsequent description).

Links▸—May open a list of targets (e.g., media elements 1690) that are linked 1010 to the selected media element 1690. Choosing one of the linked targets will move the list to the selected target. Alternatively, a list of hotspots, not necessarily linked 1010 to targets, in the selected media element 1690 is displayed. Selecting one hotspot will display a list of the targets linked 1010 to the hotspot. The latter option enables fast and intuitive navigation through component media elements 1690 of a hypervideo project.

Insert . . . —Imports a new media file 1680 and creates a corresponding media element 1690. The corresponding media element 1690 is placed before the selected media element 1690 in the list view window. The new media file 1680 can be previewed when performing the Insert function.

Delete—Deletes the selected media element 1690 from the Media Warehouse window.

Properties . . . —Permits viewing and editing of media properties of the selected media element 1690.

Editing Options

The media list of the Media Warehouse window may support the following editing commands:

Undo—Upon deleting or moving a media element 1690 in the list.

Delete—Permits multiselect deleting.

Cut

Copy

Paste

Select All—Selects all media elements 1690 currently in the list.

Viewing Options

The user can enable the Media Warehouse window to display only media elements 1690 corresponding to certain types of media files 1680, such as only video or sound files. Furthermore, the media elements 1690 in the Media Warehouse window can be manually arranged by the user. Typically, though, the media elements 1690 are automatically arranged.

Media Properties Sheet

Figure 5:
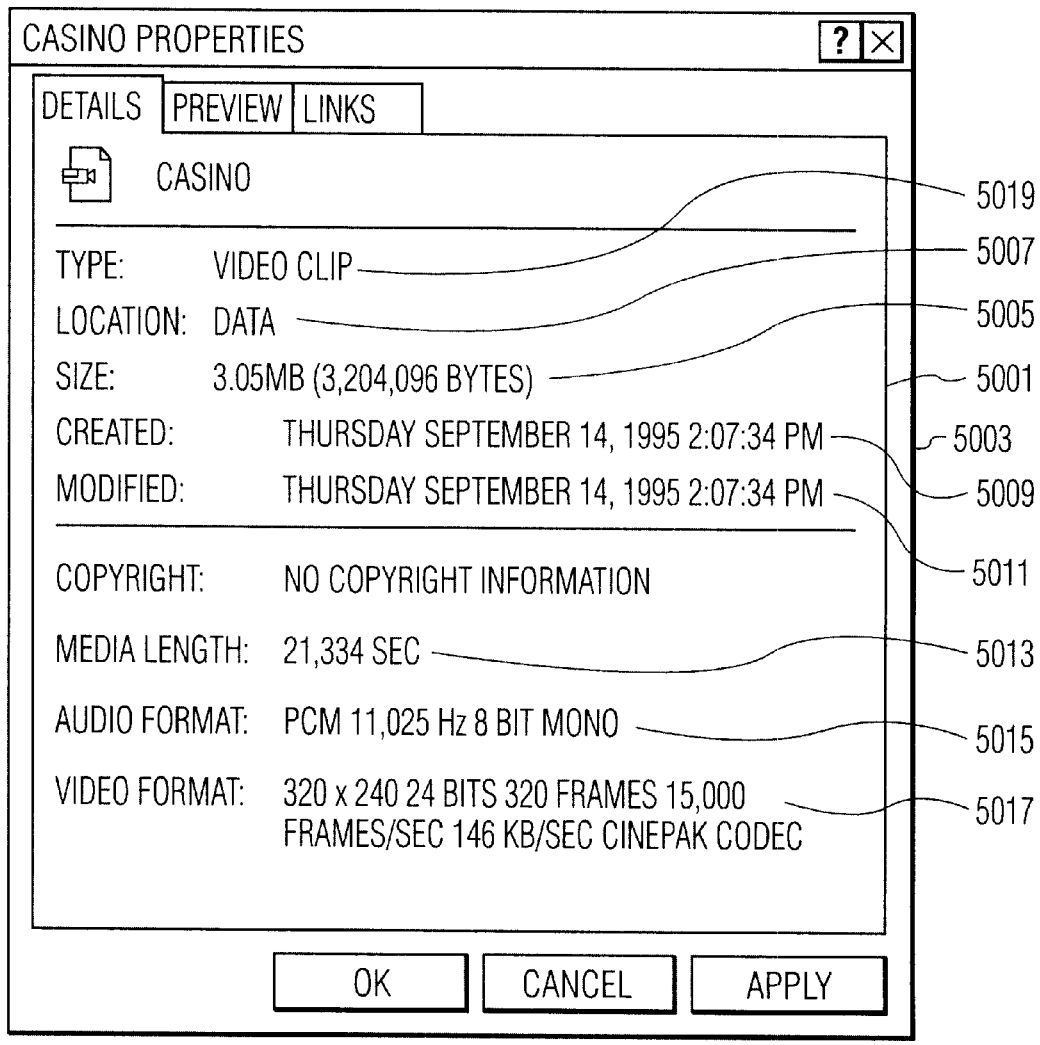
FIG. 5 illustrates an exemplary Details Page.

Properties for each media element 1690 may be shown in a Media Properties Sheet. The Media Properties Sheet may be a Win32 properties sheet with tabs that represent each page in the properties sheet. The Media Properties Sheet may include a Details, or General, page. The Details page includes general file information relevant to the specified media type. FIG. 5 illustrates an exemplary Details page 5001 of the Media Properties Sheet 5003.

The Details page 5001 may include the file name and path of the media file 1680. The media file 1680 name and path may be too long to be viewed on the Details page 5001. Therefore, only the media file 1680 name may be displayed in the Details page 5001. The path may be displayed in a tool tip when the user moves a pointer over the file name. The Details page 5001 also may include default cursors of the media element 1690.

The Details page 5001 may also incorporate general file data such as size 5005 and location 5007, together with creation and modification dates 5009, 5011. One section of the Details page 5001 may include data pertaining to the type 5019 of media file 1680 to which the corresponding media element 1690 and Media Properties Sheet 5003 are associated. Relevant data for different media file types 5019 is described below:

Video—the pertinent data may include the length in seconds 5013, and the audio and video formats 5015, 5017. Another parameter is the manual tracking speed for the video. Each video may have an optimal manual tracking speed. The user may control the manual tracking speed with a slider.

Bitmap—the pertinent data may include the pixel size of the bitmap, number of colors, and compression type if applicable.

Audio—the pertinent data may include the audio format and length in seconds.

Figure 6:
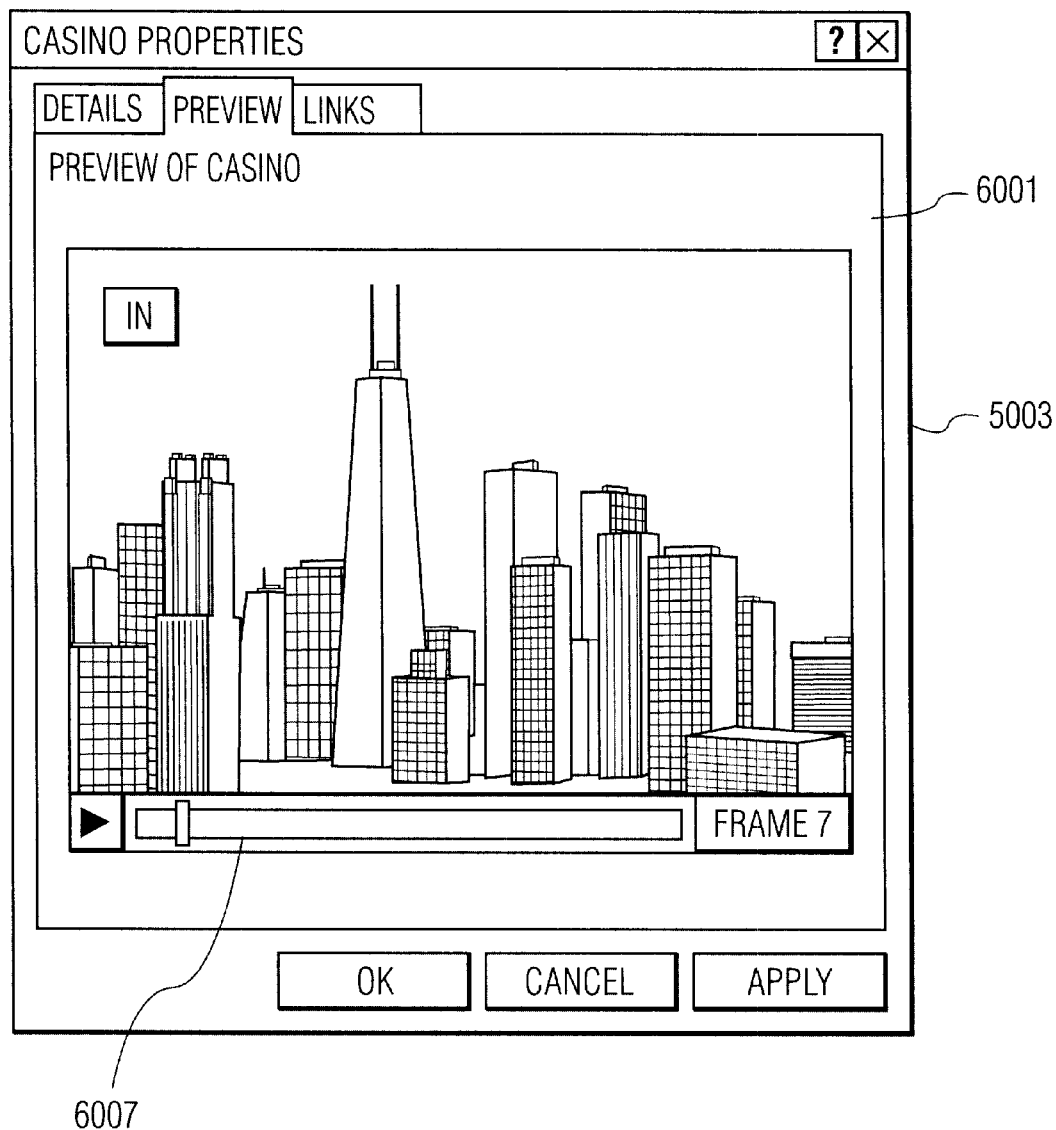
FIG. 6 illustrates an exemplary Preview Page.

The second page of the Media Properties Sheet 5003 may be a Preview page. FIG. 6 illustrates an exemplary Preview page 6001 for a video. Videos may, for example, be displayed in either 320 by 240 or 160 by 120 pixel areas. Bitmaps may be viewed in a fixed pixel area of 160 by 120. Audio emissions and video frame display may be controlled with a slider 6007 to manipulate the audio and video file advances, and also possibly to display a corresponding waveform of the audio file. Text may be shown in a scrolled window.

Figure 7A:
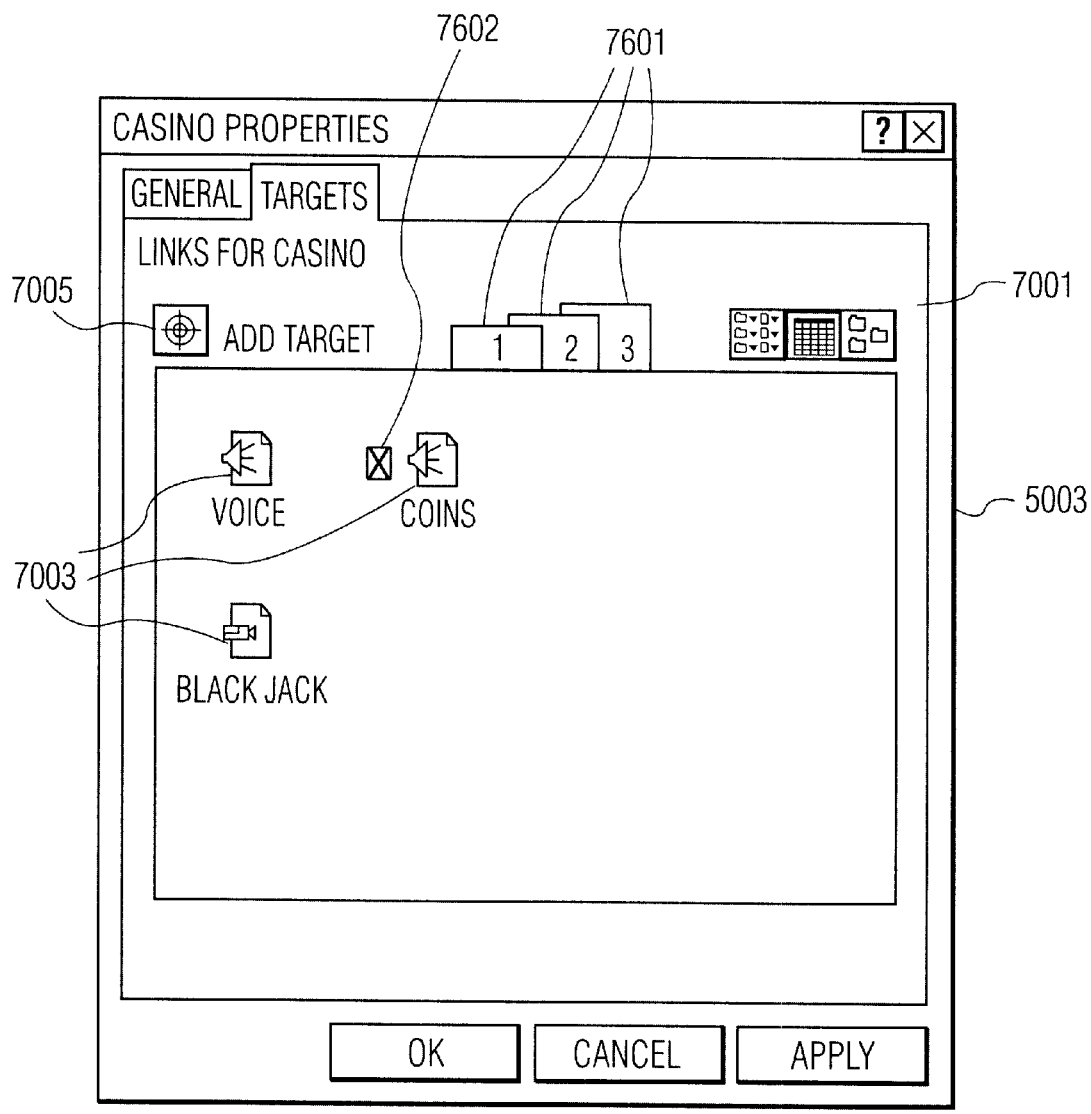
FIG. 7A illustrates an exemplary Targets Page.

The third page of the Media Properties Sheet 5003 may be the Targets, or Links, page. FIG. 7A illustrates an exemplary Targets, or Links, page 7001. In the Targets page 7001, the user can view a list of targets 7003 that are linked 1010 to hotspots in the selected media element 1690. The Targets page 7001 also includes an Add Target button 7005. The user actuates the Add Target button 7005 and holds the mouse button down just as if the user were clicking the video hotspot in the Set Target mode. The cursor changes to the Set Target cursor, and the process of setting a target begins as will be subsequently described. Other methods for linking 1010 targets to hotspots may be used.

Figure 7B:
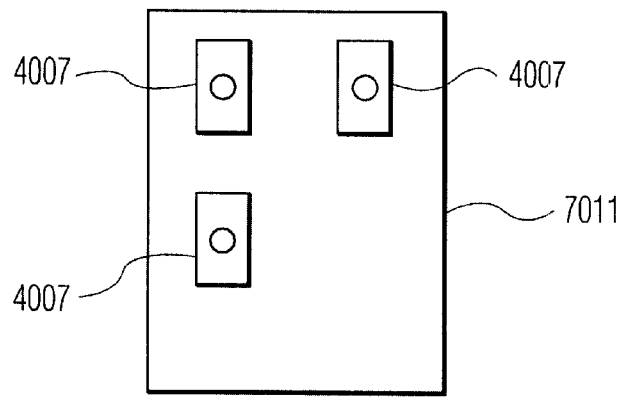
FIG. 7B illustrates an exemplary Hotspot Page.

The Media Properties Sheet 5003 may also have a Hotspot page 7011, exemplified in FIG. 7B, that illustrates the hotspots in a selected media element 1690. The Hotspot page 7011 may display a list of hotspot locations in thumbnail illustrations 4007. For a video, the thumbnail illustration 4007 may be the first frame in which the hotspot appears. Placing the pointer on a thumbnail illustration 4007 of a selected hotspot in the list and actuating, for example, by double clicking, the mouse button may cause a corresponding Hotspot Properties Sheet to be opened. The Hotspot Properties Sheet 7101 may include the Targets page 7001, which, in this case, may only display a list of targets 7003 linked 1010 to the selected hotspot.

Figure 7C:
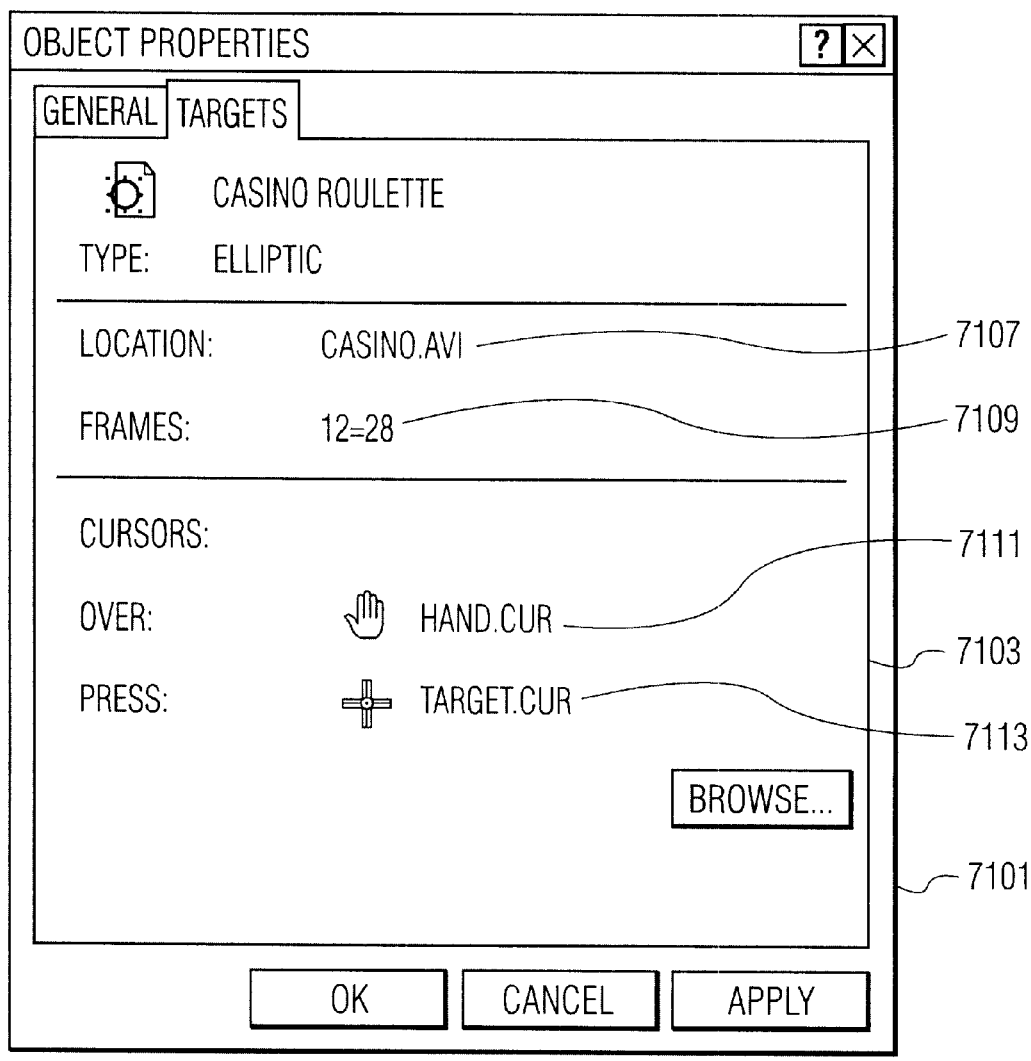
FIG. 7C illustrates an exemplary General Properties Page.

The Hotspot Properties Sheet 7101 may also include a General Properties page 7103 exemplified in FIG. 7C. The General Properties page may include the hotspot name 7103, type of shape 7105 defining the hotspot, media file name in which the hotspot is located 7107, the range of frames in a video media file in which the hotspot 8003 is located 7109, and cursor types. The cursor types include the cursor displayed when the pointer is over the hotspot 7111, and the cursor displayed when the mouse button is actuated when the pointer is over the hotspot 7113.

2.14 The Workshop

The Workshop 1005 may be used to define hotspots 1023 and create links 1010 between hotspots and targets.

Figure 8A:
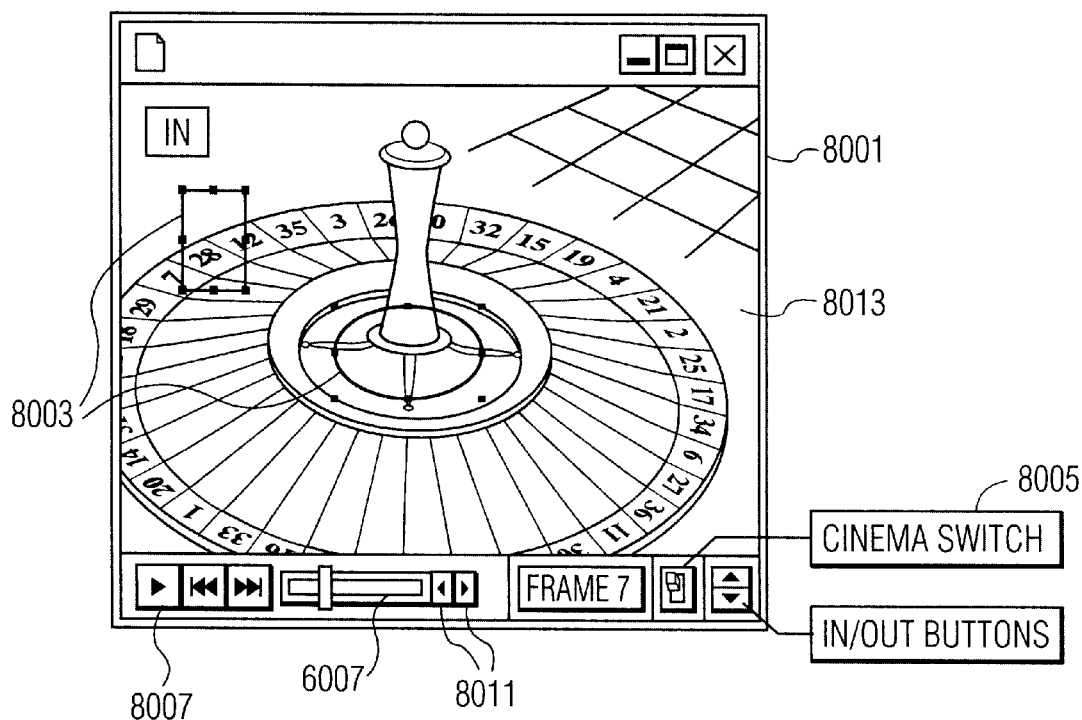
FIG. 8A illustrates an exemplary Workshop Window.

Hotspots, for example, may be created in videos and bitmaps. The project may be viewed in the Preview, or Cinema, window. The Workshop 1005 is displayed in a Workshop window that may have a toolbar window attached to it. The Workshop window changes in accordance with the tool selected from the Tools window. The Workshop window has an interface that permits selecting a specific frame in a video, and forwarding or reversing the displayed video frame. When displaying bitmaps, video frame position controls are disabled. FIG. 8A illustrates an exemplary Workshop window 8001 displaying a frame 8013 of a hypervideo.

In the Workshop window 8001, the user may define and edit hotspots 8003 in video, for example, and link 1010 the hotspots 8003 to targets 7003. The user can preview the hypervideo project by toggling the Preview, or Cinema, switch 8005 to the ON position to pop up the Preview window. The Preview switch 8005 may, however, be a button.

The Workshop window 8001 may include the following features items:

Play button 8007—plays and pauses a video. The play button, as for many player interfaces, turns into a Pause button while the video plays.

Home (or In) button—displays the IN frame (default is the first video frame).

End (or Out) button—displays the OUT frame (default is the last video frame).

Slider 6007—permits the user to select a desired frame of a video. The frames of the video are displayed as the slider is moved.

Frame 8011 +/− buttons—respectively moves one frame 8013 forward (+) and backward (−), and is useful for pinpointing a particular frame.

Scale Information—gives the user frames/time information.

Preview switch 8005—opens the Preview window.

The Workshop window 8001. may serve as a video viewer. With the Tools window, a user can also use the Workshop window 8001 to define hotspots 8003 and links 1010 to targets 7003. The Preview and Tools windows will now be described.

The Preview Window

Figure 8B:
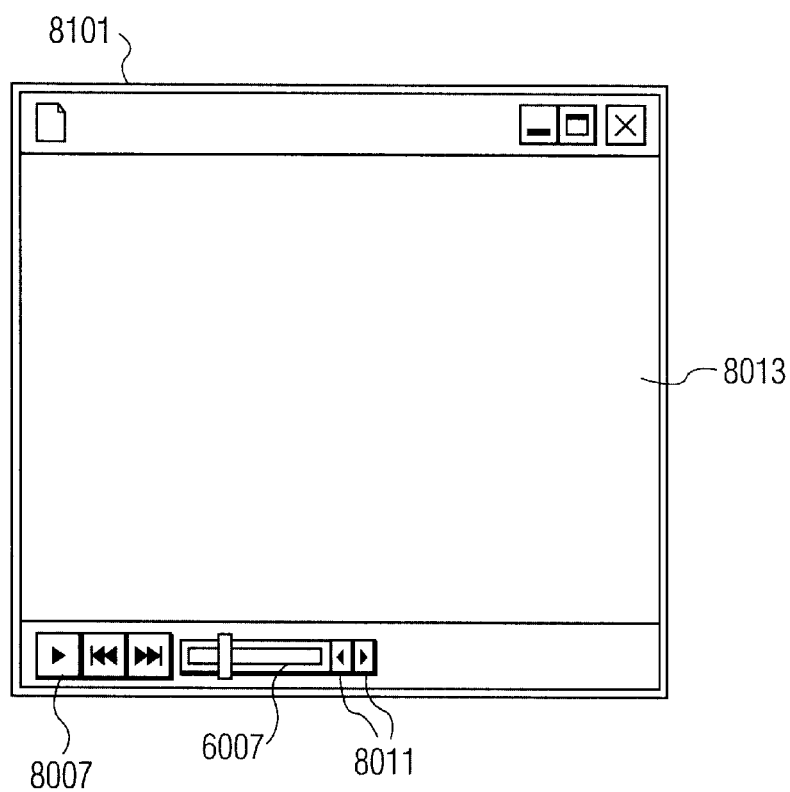
FIG. 8B illustrates an exemplary Preview Window.

The Preview window is a hypervideo player in the authoring tool 1001. In the Preview window, the user can execute targets by activating, or actuating, hotspots in the hypervideo, for example. The Preview window 8101, illustrated in FIG. 8B, may be similar to the Workshop window 8001 except for the fact that it is a video viewer that may not permit editing. In this case, the IN/OUT and Preview 8005 switches are absent.

2.141 Hotspot Definition

Hotspots 8003 are defined in media, such as video or bitmaps, in the Workshop window 8001 with the methods described below.

The Tools Window

The Tools window 9001 includes one or more dockable toolbars that are used to define hotspots 8003 and link 1010 hotspots 8003 to targets 7003.

Figure 9A:
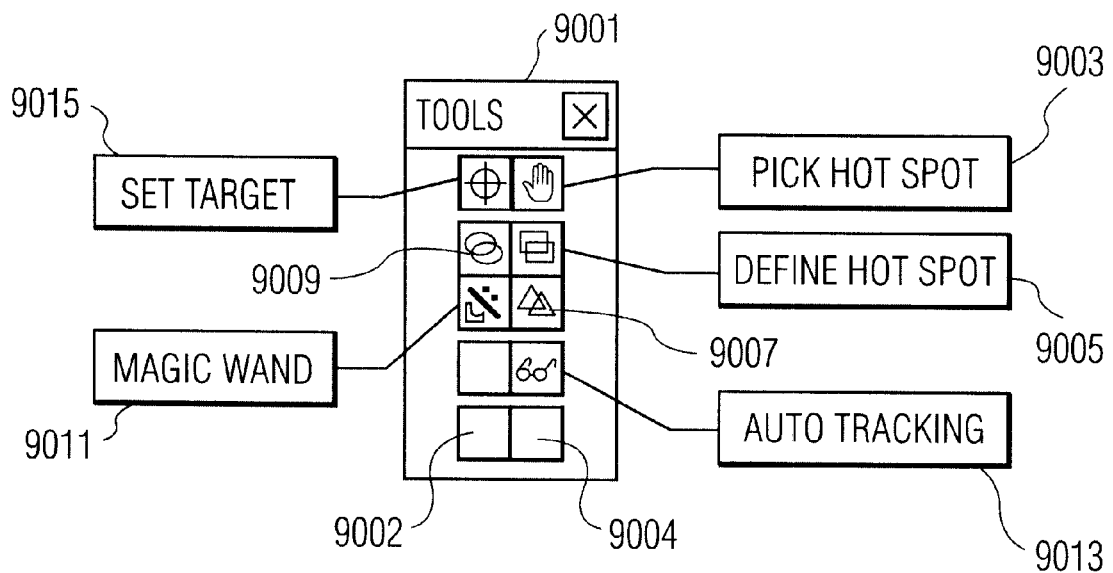
FIG. 9A illustrates an exemplary Tools Window.

FIG. 9A illustrates an exemplary Tools window 9001. Typically, the Tools window 9001 may be attached to the Workshop window 8001.

The Tools window 9001 can dock on any side of the Workshop window 8001. The Tools window 9001 is a toggle toolbar. Thus, only one button (i.e., mode) can be used at any instance of time. The Pick Hotspot button 9003 may be the default selection mode of the Tools window 9001. Each selected mode changes the behavior of the Workshop window 8001. The Tools window 9001 modes will now be described:

Pick Hotspot

The Pick Hotspot mode 9003-permits the user to select and manipulate a defined hotspot 8003. In this mode, the user can:

Select a hotspot 8003 or a group of hotspots.

Reposition a hotspot 8003 in the current frame.

Resize a hotspot 8003 in the current frame.

Double click on the hotspot 8003 and view its properties.

Press Del (Delete) and delete the hotspot 8003.

Holding down the SHIFT key while moving the Workshop window slider 6007 marks a selection of frames. Any action that is performed in the Pick Hotspot mode 9003 will be executed throughout the range of selected frames.

Define Hotspot

The Define Hotspot mode 1025 permits definition, or segmentation, of new hotspots 8003. When selecting the Define Hotspot mode 1025, all previously selected hotspots 8003 are deselected. The hotspot is then defined by drawing the desired shape 91037. The user may select a primitive shape 1039 from the Tools window 9001 shown in FIG. 9A. The primitive shape 1039 may be, but is not limited to, an ellipse 9009, a triangle 9007, or a rectangle 9005. The primitive shape 1039 may be default-sized. However, a polygon 1041 may also be selected. The user may then place the selected shape in the media in the Workshop window 8001. After the shape has been placed, the Tools window 9001 may automatically switch to the Pick Hotspot mode 9003. Then, the user can manipulate the size and position of the selected shape to define the hotspot 8003. Hence, the hotspot's geometric form may be defined.

Hotspots 8003 having the shape of a polygon 1041 can be defined, for example, in one of three ways:

(1) With a magic wand 9011, described below;

(2) With a polygon drawing tool with which the user draws lines between polygon vertices; and (3) With freehand drawing, the user draws the hotspot 8003 in freehand form and the Workshop 1005 calculates the optimal number of vertices limited by the maximum number of vertices parameter.

Hotspots 8003 having the shape of a polygon can be re-sized using a bounding rectangle or by moving each vertex of the polygon. The user can select either mode in the Workshop window 8001.

Upon its creation, a new hotspot 8003 may be given a default name, which may be changed later. The hotspot name may be added to a list of defined hotspots 8003 in the Workshop's Tools window 9001, which may also include a Hotspot toolbar. If the user double-clicks the mouse button when the pointer is over the hotspot 8003, the Hotspot Property Sheet 7101 may be displayed. In the Hotspot Property Page, the user can assign a different name to the hotspot 8003, and the cursors that are to be used when the pointer is positioned over the hotspot 8003 or when the hotspot 8003 is activated.

Furthermore, the Hotspot toolbar allows the user to select a hotspot 8003 and display the first frame in which that hotspot 8003 appears in a video. The user can also open the Hotspot Property Sheet 7101 from the Hotspot toolbar as well as delete the currently selected hotspot 8003 and all of its occurrences.

Magic Wand

The Magic Wand 9011 is used to define a hotspot 8003 automatically 1033, rather than with shape drawing 1037. When the user points the Magic Wand 9011 at a pixel in a region of interest, which may be defined as a hotspot 8003, and actuates a mouse button, the Magic Wand 9011 searches for edges around the pixel 1049 that define a new hotspot 8003 or modify a pre-existing hotspot 8003. The Magic Wand 9011 may use either the rays or flood-fill algorithms 1051, 1053. With the flood-fill algorithm 1053, flooding can be performed based upon either the Red-Green-Blue (RGB) or luminance values of pixels. The flooding may be performed within a tolerance range of RGB color or luminance values around respectively an initial RGB color or luminance value of the pixel. As a result, all pixels surrounding the initial pixel with a RGB or luminance value within the tolerance range will be flooded. The tolerance range can be modified by the user. Flooding may require a line-table hotspot type.

Hotspots 8003 may be added or subtracted from one another to create hotspots 8003 of complex shapes. New hotspots may be created by uniting, or adding, multiple hotspots with one another, subtracting one hotspot 8003 from another, or by intersecting multiple hotspots. The flood-fill algorithm 1053 may also permit incremental hotspot definition by adding newly flooded areas to areas that are already flooded. The flood-fill algorithm 1053 may also permit flooding out areas that are already flooded. The user can interact with the flood-fill algorithm 1053 with a floating menu or the alternate mouse button.

With the rays algorithm 1051, imaginary rays in different directions are launched either outwards from an initial point, or from the hotspot 8003 borders inwards towards the initial point. The rays algorithm 1051 searches along the rays for intersections with the region of interest borders, or edges, that will define the hotspot 8003. The edge points along the rays will be scored using different edge scoring algorithms. Upon completing score, a point on the ray may be selected that either has the best score or is the first point to have score that exceeds a threshold value. When intersection point is found, the intersection point is selected as a new polygon vertex. The number of rays used to define the hotspot 8003 can be modified by the user. The Magic Wand 9011 can also use edge-enhancing filters 1043 using threshold 1045 and spatial derivative 1047 techniques, prior to using the edge detection algorithms.

Zoom Options

The Workshop window 8001 may permit zooming within a frame to define hotspots 8003 more accurately. This feature may be particularly useful for creating a hotspot 8003 in the shape of a polygon 1041 with, for example, the magic wand 9011 or freehand drawing.

Merging Hotspots

The user can merge multiple hotspots 8003 that may have different shapes into a single hotspot 8003. Hotspots 8003 can be merged over a selected range of one or more frames in a video. Additionally, the user can remove a hotspot 8003 from a group of merged hotspots. The user interface for merging hotspots 8003 can be incorporated into either the Workshop window 8001 or the menu bar. A dialog may be used to enter data pertaining to merged hotspots.

Interpolation

Interpolation 1027 permits a user to quickly create hotspots 8003, for example, in a range of video frames. One embodiment of creating a hotspot 8003 with interpolation 1027 will now be described. First, the user defines the hotspot 8003 in a selected initial, or first, video frame, and presses the Interpolate From button 9002. As a result, the hotspot's color changes. Next, the user defines the hotspot 8003 in a selected last, or second, video frame, after the initial video frame, of the desired range, and presses the Interpolate End button 9004. As a result, the hotspot 8003 is defined by interpolation of size and position in the desired range of video frames. In one embodiment, interpolation 1027 is performed with linear interpolation. The Interpolate From and End button 9002, 9004 may, for example, be part of the Tools window 9001.

The user can also define the hotspot 8003 in one or more selected intermediate frames between the initial and last video frames. As a result, the hotspot is defined by interpolation, such as linear interpolation, between each successive selected video frame. Also, a hotspot 8003 may be defined by interpolating between two different shapes, for example, in two different frames of a video.

2.142 Hotspot Tracking

Upon defining a hotspot in an initial frame of video, the hotspot can be tracked 1029 through successive frames. Tracking may be performed manually 1035 or automatically 1061. Hotspots can be tracked while the video is playing in reverse.

Manual Tracking

Manual tracking 1035 permits the user to control the placement and size of he hotspot 8003 in each frame of the video. An exemplary method for manual racking 1035 will now be described. First, the user selects a hotspot 8003 by depressing a (e.g., left) mouse button. Then, while depressing the (e.g., left) mouse button, the user actuates, such as by clicking, the (e.g., right) alternate mouse button. The video will then start playing frame by frame at the specified tracking speed set in the video's Media Properties Sheet. Manual tracking 1035 is performed as long as the user keeps the mouse button depressed. The user toggles 1057 between executing and pausing manual tracking 1035 by respectively depressing and releasing the alternate mouse button. The user can manually move, or slide, 1055 the hotspot 8003 position 1059 about the Workshop window 8001 by moving a mouse, for example, while the video is playing. The user can resize 1059 the hotspot 8003 with the arrow keys while manual tracking 1035:is being performed.

Upon releasing the mouse button, the hotspot 8003 will remain selected. However, the Workshop window mode changes automatically to Pick Hotspot mode 9003. In this mode, the user can resize and move the hotspot 8003. Also, the user can then continue to track the hotspot 8003 either manually 1035 (described above) or automatically 1061.

The user can freely switch between manual and automatic tracking. If the user wants to redefine an existing hotspot, the user can select the Pick Hotspot mode 9003 and again track, manually and/or automatically, the selected hotspot.

Automatic Tracking

Automatic tracking 1061 is activated from the Tools window 9001. A hotspot 8003 in an initial frame must be selected to be tracked. Upon automatic tracking 1061 activation, a new view window is opened and the tracking results are displayed there. Utilizing Win32 multithreading, for example, multiple hotspots 8003 can be simultaneously tracked in separate tracking windows. The hotspot 8003 may then be defined in succeeding frames until the automatic tracking 1061 is halted. When the automatic tracking 1061 is halted, the view window may close and the Workshop window 8001 is updated with the frame at which the automatic tracking 1061 halted.

Figure 9B:
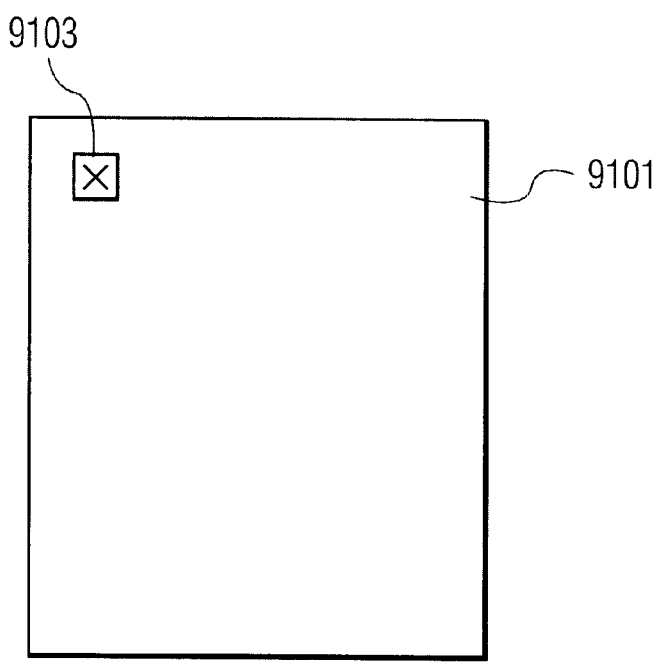
FIG. 9B illustrates an exemplary Tracking Property Sheet.

Automatic tracking 1061 of a hotspot 8003 is accomplished with image-processing algorithms. Both the location, or position, and size of a hotspot 8003 may be automatically tracked 1061 over a range of frames in a video. Location tracking 1073 identifies and follows any changes in the location of the tracked hotspot. Size tracking 1069 identifies and follows any change in the size of the region of interest corresponding to the hotspot 8003. Size tracking 1069 may include a resizing algorithm 1071 to efficiently create resized copies of the frame or the region of interest, which may be defined by a bounding rectangle. Size changes are usually due to a change in perspective like zooming. Size tracking 1069 can be disabled in a Tracking Property Sheet 9101, exemplified in FIG. 9B, for example, with a flag 9103.

Automatic tracking 1061 is performed with tracking algorithms 1063, which may include methods of selective enumeration 1065 and scoring 1077. Selective enumeration 1065 may be performed for each frame to determine the new position and size of the hotspot 8003, described above.

Selective enumeration 1065 may be performed for each frame with a steepest, or gradient, descent algorithm 1067 to postulate hotspot 8003 size and position. Selective enumeration 1065 usually avoids enumerating all possible locations and sizes, thus increasing the speed of the automatic tracking 1065 process. Using the steepest descent algorithm 1067, a path will be found to the hotspot position and size having the best score usually without having to enumerate all possible hotspot 8003 positions and sizes. This technique is efficient for determining hotspot 8003 size and position that greatly differ from the hotspot 8003 size and position in a previous frame.

Automatic tracking 1061 may be stopped and tracking failure may be declared if the selective enumeration 1065 reaches a maximum offset without a minima being found by the gradient algorithm 1067, or if the best score found does not exceed a threshold beyond the average score of all enumerations. To detect when a hotspot 8003 exits a frame, the part of the shape still in the frame may be enumerated with a boundary compensation algorithm 1075.

For each enumerated size and location, scoring 1077 is performed to determine hotspot matching 1079 by correlating the postulated hotspot in the new size and position with the hotspot 8003 in the previous frame, and to recognize tracking failure. Hotspot matching 1079 may measure the correlation, or similarity, of two hotspots in the following way. Shape iteration 1085 may be used to enumerate efficiently the respective pixels in the postulated hotspot and the hotspot in the previous frame, and to calculate the sum of the differences between each set of two corresponding pixels in the postulated hotspot and the hotspot 8003 defined in the previous frame. A smaller sum indicates a high similarity between the postulated hotspot and the hotspot 8003 in the previous frame. The difference can be measured either by calculating the luminance delta 1083 of the corresponding pixels, or by calculating the RGB maximum delta 1081, otherwise known as the maximum norm of the RGB delta values, of the corresponding pixels.

To recognize tracking failure, a simple scoring average may be calculated and compared against a best score. If the best score does not differ dramatically from the average score, the automatic tracking 1061 process will declare a failure. However, normalized scoring using variance and weighted score averaging can also be used. Additionally, the tracking process can be improved by filtering each frame. For example, smoothing or four pixel filters can be used. Special filters can be assigned to specific tracking algorithms 1063 and scoring 1077 methods.

Scoring efficiency can be enhanced by using the signature 1087 of the tracked hotspot. The hotspot signature 1087 may be a characteristic of the hotspot 8003 in the first frame the hotspot 8003 was defined. For example, the signature 1087 can be the offset between the center of mass 1089 and the geometric center of he hotspot 8003. The RGB or luminance content of each pixel is used to determine he mass of each pixel. To calculate the center of mass 1089, the hotspot's pixels ay be enumerated using shape iteration 1085. The benefit of using a signature 1087 is that the score may be calculated by comparing data from the current frame with the signature of any previous frame. Hence, the pixel data of the entire previous frame need not be stored.

Smart scoring can also be used. With smart scoring, the scoring system learns from each tracking step. For example, relying upon temporal coherence 1086 of a moving hotspot, the hotspot motion can be evaluated and new suggested positions and sizes for the hotspot 8003 may be estimated in accordance with the motion trend of the hotspot trends.

Polygons can be automatically tracked 1061 using different techniques, including those described below. First, the bounded rectangle around a polygon can be tracked, and the polygon moved, as is, to the new tracked location. Second, the magic wand 9011 algorithms can be used to adjust the polygon shape after tracking, as described above in the first technique. A third alternative is to use a shape iterator 1085, discussed above, for a polygon, and an inflating or resizing algorithm 1071 to track and directly score the size and position of the polygon.

2.143 Targets

The user can create a hypervideo that is nonlinear 1009 by linking 1010 a hotspot in a source media to one or more targets 7003. A target 7003 may be a playing instance of a media element 1690 including certain parameters exemplified below. Nonlinear authoring 1009 may permit source media and targets to be executed and terminated in a variety of ways, as will subsequently be described. The hypervideo includes one or more base targets, such as a video target, that are executed when the hypervideo commences. Targets 7003 may, for example, be media elements 1690 or static targets 1022. Media element 1690 targets may include, but are not limited to:

1. Video 1011—may be used as hotspot containers from which the user can hyperlink to media. Video targets 1011 (i.e., video media files) are not restricted to any specific format. For example, the hypervideo environment 1000 supports video formats including, but not limited to, Video for Windows (AVI), QuickTime (MOV), motion JPEG and MPEG I and II (MPG) files. Video targets 1011 may, for example, be in any format for which an MCI driver is available.
2. Sound 1015—may be used, for example, as a connecting segment between two videos. A sound target 1015 can be a vocal announcement when the user actuates a mouse button when the pointer is over an image, for example, of a person.
   Supported sound target 1011 (i.e., sound media file) formats include, but are not limited to, WAV, AIF, RMI and MID.
3. Picture 1013—may be used as hotspot containers from which the user can hyperlink to media. Supported picture target 1013 (i.e., bitmap media file) formats include, but are not limited to, DIB, BMP, GIF, PCX, TIFF, JPEG and PICT.
4. Text 1017—may be used, for example, as a connecting segment between two videos. Text targets 1017 may appear in boxes, such as message boxes. Text targets 1017 can be in, but are not limited to, a TXT or RTF file format, or stored directly in the project file 1670. Text targets 1017 may be displayed with bitmaps also.
5. Executable 1021—may be used to launch an executable program (e.g., EXE or BAT file) as a target.
6. HTML File 1021—may be opened with a browser (e.g., Internet browser for the World Wide Web) or an OLE control for viewing an HTML file.

7. URL Addresses 1021—may be targets created with the authoring tool 1001 and stored as text. Upon activation of this target 7003, a browser, such as an Internet browser, may be launched to access the URL.
8. QuickTime VR 1021
9. Dialogues 1021

Targets may also include, but are not limited to other applications and processes, communications links to other computers, function menus, high definition television signals, and virtual reality environments.

A static target 1022 is not a media element 1690, but controls a media element 1690 in a hypervideo project. Static targets 1022 include:
1. Back Target—Goes back to the media element 1690 that launched the target 7003.
2. Exit Target—Exits the hypervideo, closes the video window, and returns control to the system or application that started the hypervideo player.
3. Pause Target—Pauses the hypervideo and causes a play button to pop up that enables the user to continue playing the hypervideo by actuating the button.

Other targets 7003, external to the hypervideo authoring software, may also be accessed. External targets may be accessed through a DLL file complying with API requirements to permit an open architecture for the hypervideo environment 1000.

Targets 7003, such as media, can be stored on servers 1655 on local or wide area networks 1650, 1115. Specifically, media, such as video, can be stored on high capacity storage devices such as, but not limited to, digital video, or versitile, disks (DVDs) 1159.

Linking A user may link 1010 a target 7003 to a hotspot 8003 by the following method:
1. Actuate the mouse button when the pointer is over the Set Target button 9015 in order to enter the Set Target mode. The cursor changes to indicate entrance to the new mode.
2. Select a hotspot 8003 to which the target 7003 will be coupled with the new cursor while not releasing the mouse button. The Set Target movement is a drag-and-drop action.
3. While continuing to hold down the mouse button, drag the new cursor onto the Media Warehouse window and the selected media element 1690 that is to be the target 7003. When the user moves the pointer to a border of the Media Warehouse window, the contents of the Media Warehouse window scroll without releasing the mouse button. The cursor may be changed when a media element 1690 is selected as a target 7003. Depending on the type of target 7003 selected, a Target Properties Sheet 7703, described below, may pop up when the mouse button is released. The user may then enter the properties of the target 7003 into the Target Properties Sheet 7703. Other techniques to link 1010 a hotspot 8003 to a target 7003 may be used.

Target Properties and Multiple Targets

Each hotspot 8003 can have multiple targets 7003. Thus, while playing a hypervideo when the user actuates a mouse button when the pointer is over a hotspot 8003, one or more targets 7003 can be executed or activated. Multiple targets 7003 can be executed sequentially, in parallel or a combination thereof. When the user activates or actuates the hotspot 8003, multiple targets 7003 can be executed in different levels 7601 (e.g., 1, 2, 3, etc.). Levels permit the multiple targets 7003 to be played simultaneously (same level) and sequentially (ascending levels). Each level has a Leader target 7602 which upon ending terminates all other targets 7003 in its level.

Figure 7D:
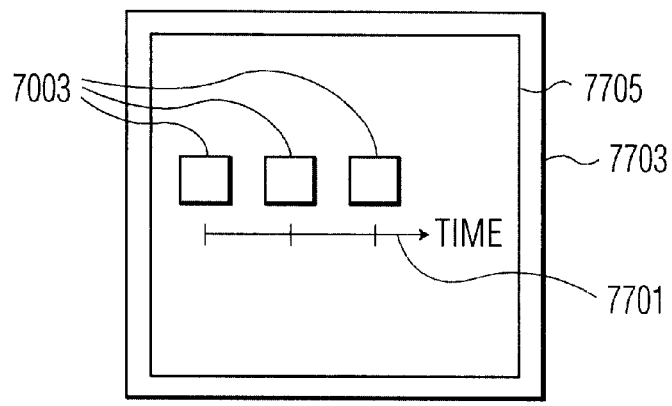
FIG. 7D illustrates an exemplary Time Line.

Alternatively, the targets 7003 can be positioned and displayed on a time line 7701, exemplified in FIG. 7D. As a result, one target 7003 can be initiated during the performance of another target 7003. The time line 7701 can be illustrated on a story board page 7705 of the Target Properties Sheet 7703.

Figure 7E:
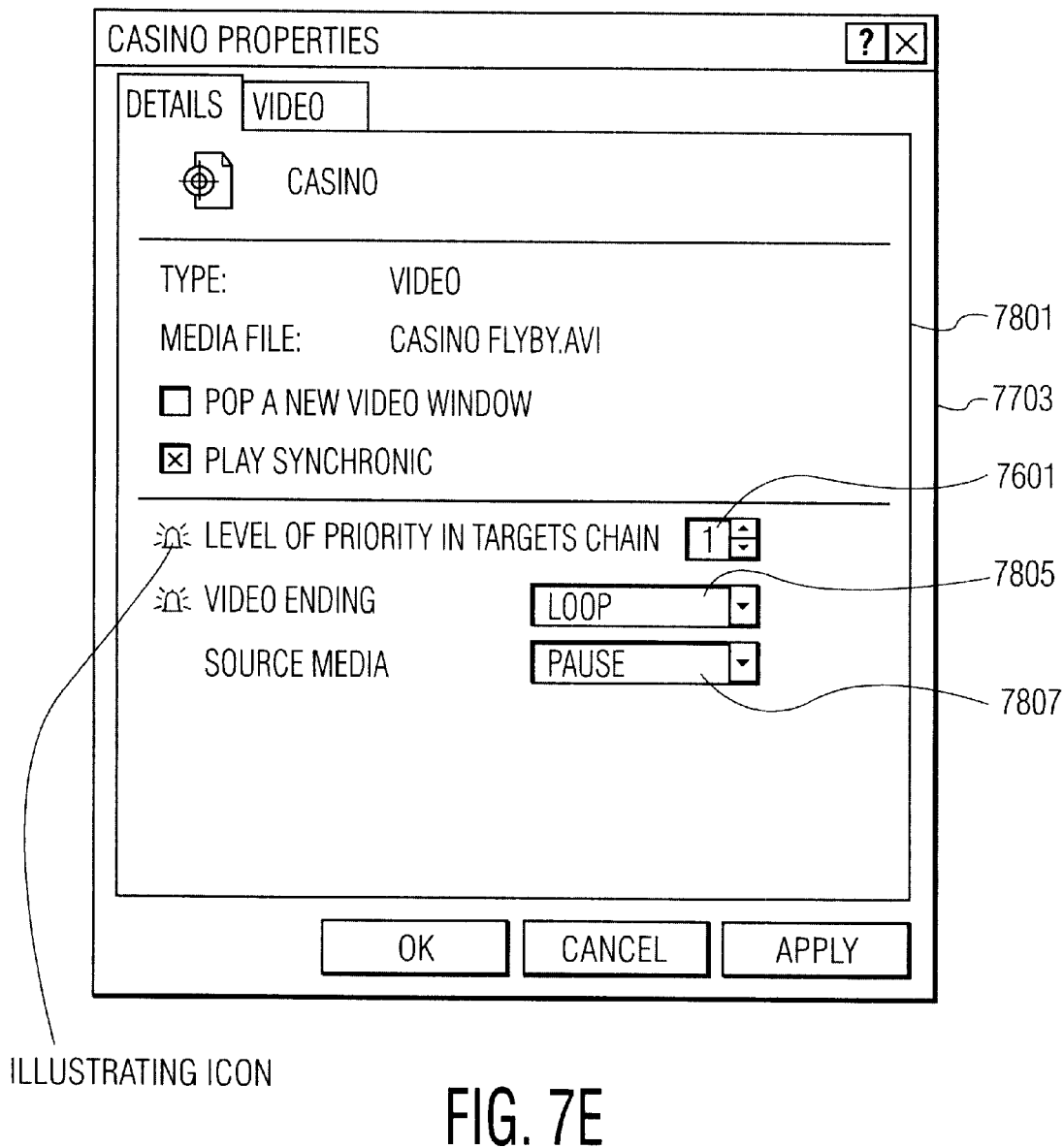
FIG. 7E illustrates another exemplary Details Page.

When the user selects a target 7003 for a hotspot 8003, a Target Properties Sheet 7703, which may include a target dialog for the selected media element 1690, may be opened and a new target 7003 is created. The Target Properties Sheet 7703 may include a details page that lets the user enter target parameters. . The. Details page 7801, exemplified in FIG. 7E, may include target 7003 parameters that are unique to the selected media type and permit nonlinear authoring 1009. In the Details page 7801, the user may choose whether the source media, such as video or bitmap, from which the target 7003 was launched, should Pause, Close or Keep Playing 7807 when the target 7003 is executed. The user may also specify how a target 7003 is terminated 7805. Options include:

Continue the hypervideo.

Go Back to the source from which the target originated, skipping subsequent level targets.

Loop—execute the target media in a loop.

Freeze the target's last frame.

Exit the hypervideo.

Figure 7F:
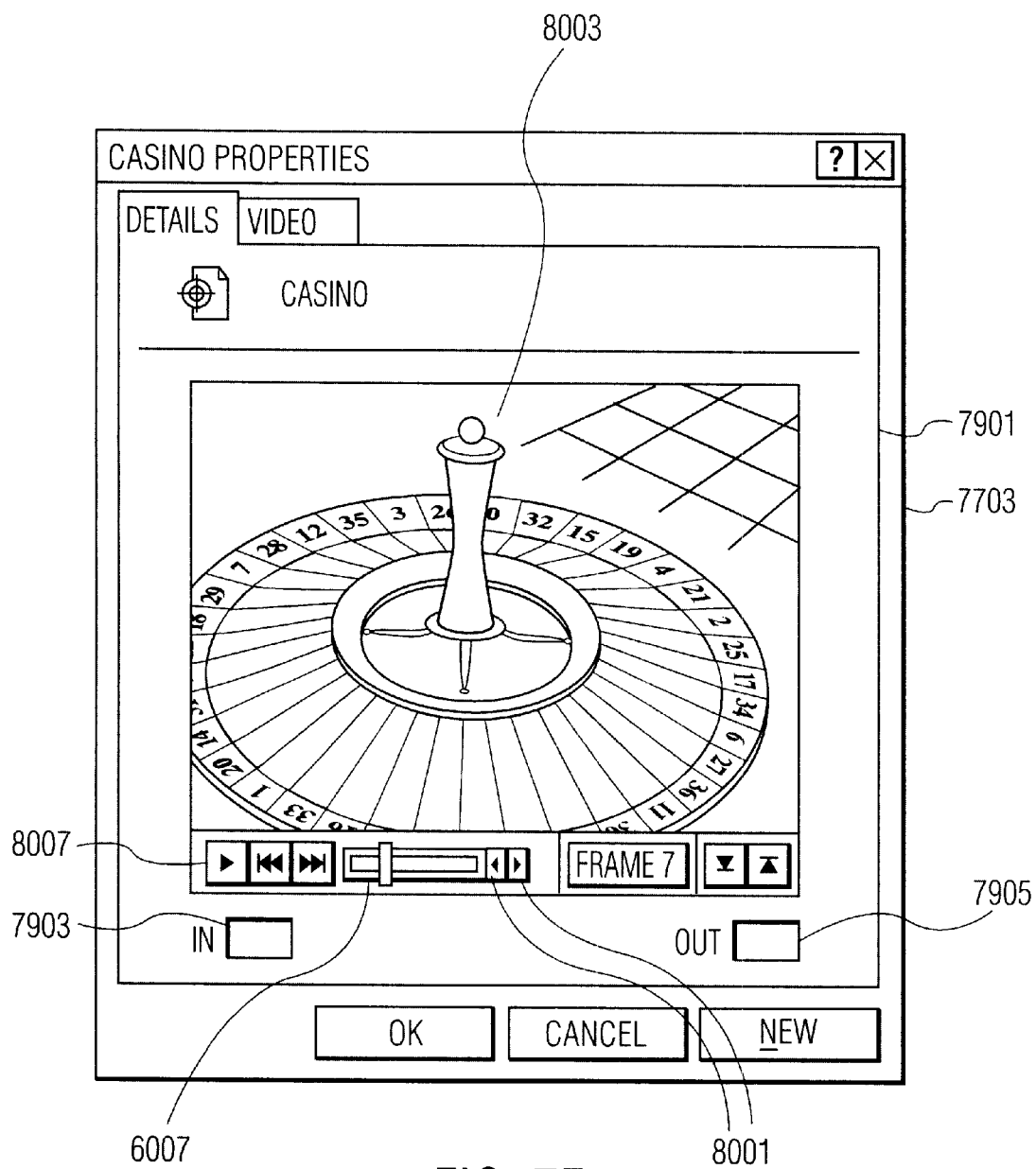
FIG. 7F illustrates an exemplary Frame Window.

A second, optional page in the Target Properties Sheet 7703 is a frame window 7901, exemplified in FIG. 7F, much similar to the preview page 6001 in the Media Properties Sheet 5003. The Target Properties Sheet 7703 includes, for some of the media types, a Range, or Frame, window that lets the user specify a segment of the target media that will be played. This option may be applicable to video and audio targets 1011, 1015. The frame window 7703, unlike the preview page 6001, lets the user define the IN and OUT frames and times 7903, 7905 for video and audio media files, respectively, to determine starting and stopping frames and times for playing those media files.

The Target Properties Sheet 7703 may also include a Display properties page 7950, for example, for visual media types, including, but not limited to, video and bitmaps. In the Display properties page 7950, the user may choose how the target 7003 will be projected to the user, as described in the following tables.

Figure 7G:
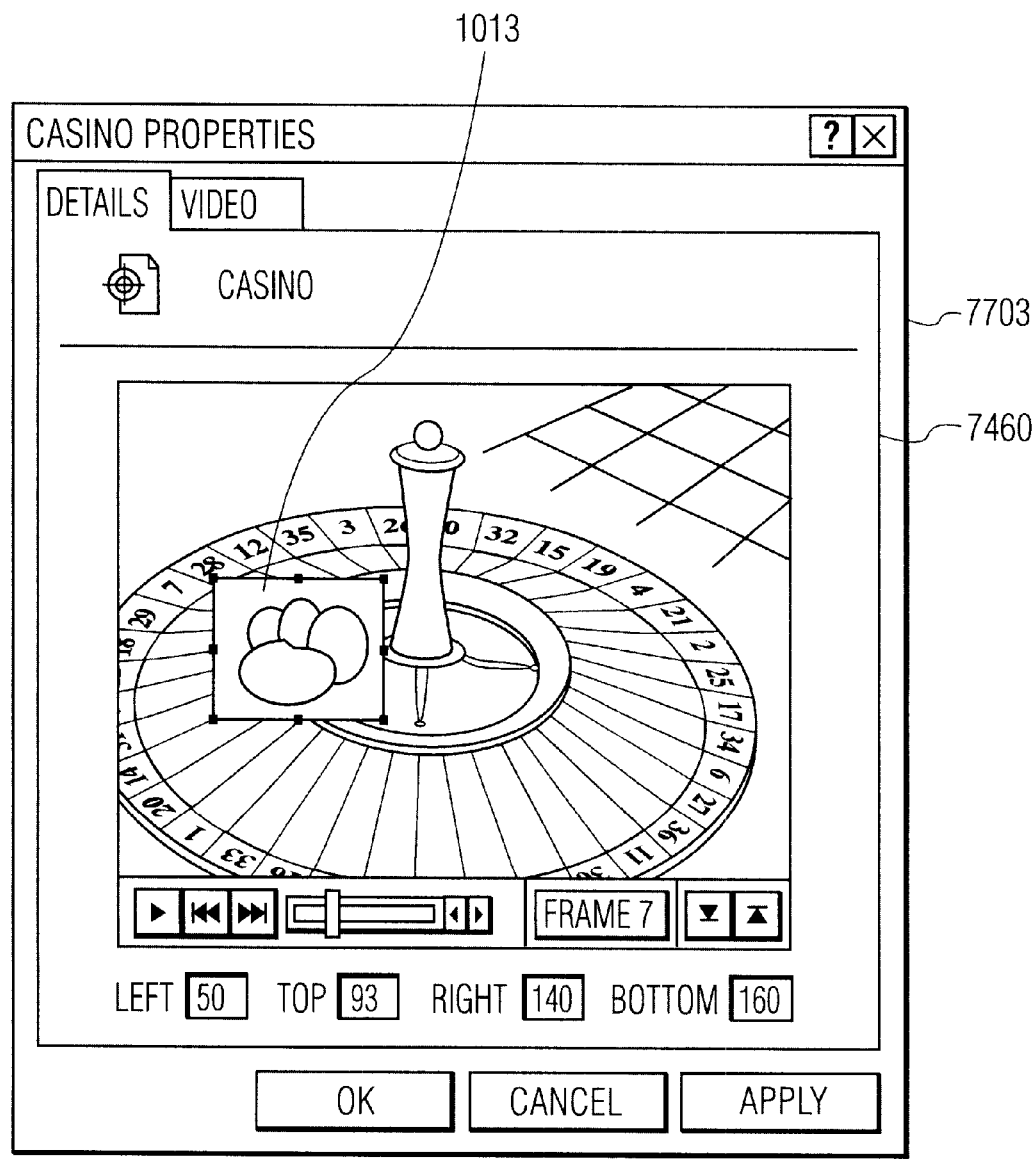
FIG. 7G illustrates an exemplary Place Properties Page.

Bitmap targets 1013 may have a Place Properties page in their Target Properties Sheet 7703, exemplified in FIG. 7G, that permits the user to position a Bitmap over a source element, such as a video.

Upon entering target parameters into the Target Properties Sheet 7703, the user may press one of the following buttons:
1. OK 7811—Creates a target 7003 for a hotspot 8003 and folds the Target Properties Sheet 7703.
2. Apply 7813—Creates a new target 7703 for a hotspot 8003. Does not fold the Target Properties Sheet 7703.
3. Cancel 7815—Closes the last opened Target Properties Sheet 7703.

The following tables describe the different targets 7003 and corresponding parameters. The Sync parameter may not be permitted to be FALSE with any ending parameter setting other than Continue.

Video Targets

The following table describes parameters for video targets 1011.

| Name | Type | Description |
|---|---|---|
| PopWindow | Check Box | Specifies whether the video target 1011 is executed, or played, in the main video window of the hypervideo project or pops up in a new window. TRUE means the target pops up in a new window. Default setting is FALSE. |
| Move | Check Box | In case a pop-up window is selected, indicates whether the pop-up window should be moved when the user resizes the main video window. |
| Resize | Check Box | In case a pop-up window is selected, indicates whether the pop-up window should be resized when the user resizes the main video window. |
| Position | RECT. | When the video target 1011 plays in the pop-up window (PopWindow = TRUE), the user must enter the top left coordinates and the width and height of the new window. The RECT contains the format: left top width height. In case the width and height are absent, the default is the original size of the video. |
| Sync | Check Box | Specifies whether the hypervideo plays while the video target 1011 plays. This parameter is applicable only if the video target 1011 plays in the pop-up window (PopWindow = TRUE). The default setting is TRUE. When this parameter is FALSE, the Back option for ending the video is not applicable. |
| In[1] | Button - Marker | This button places a video▼ marker which indicates the first frame to play in a range of frames in a video target 1011. |
| Out[1] | Button - Marker | This button places a video▲ marker which indicates the last frame to play in a range of frames in a video target 1011. |
| Ending | Combo Box | Indicates what action to take when the video target 1011 ends playing. The options are:<br>Loop - Loops the video target 1011.<br>Back - Goes back to the source from which the video target 1011 originated. This option is not applicable in case the Sync parameter is set to FALSE.<br>Exit - Exits the hypervideo project player.<br>Freeze - Freezes the hypervideo.<br>Continue - Terminates the video target 1011 and proceeds to the next target.<br>The default option is Continue. |

[1]The In and Out options are supported by a slider 11,004 that controls the display of the video. The user moves the video to the desired frame and clicks the appropriate button. In case the In marker is placed after the Out marker, the authoring tool 1001 may ask the user whether the markers should be swapped or deleted.

Spatial-Temporal Relative Links

Nonlinear authoring 1009 may also permit targets 7003, such as video targets 1011, to be linked 1010 to temporal 1014, in addition to or in alternative to spatial 1012, coordinates of a hotspot 8003 in a source media. For a temporal relative link 1014, a base frame in a video target 1011, for example, is defined for the first frame in which the hotspot 8003 appears in the source media element. In later frames of the source media element, the hotspot 8003 is linked 1010 to successive frames in the video target 1011 that are temporally related to the base frame. For a spatial relative link 1012, the position, and possibly the size, of the executed, or displayed, video target 1011 is relative to the hotspot's position or to the pointer's position when the hotspot 8003 is activated.

Bitmap Targets

The following table describes some Bitmap target 1013 parameters.

| Name | Type | Description |
|---|---|---|
| Position | RECT. | The run-time module 1101 needs the top left coordinates and the width and height of the bitmap window. The RECT contains the format: left top width height. In case width and height are absent, the default is the original size of the bitmap. |
| Duration | Milliseconds | The duration in milliseconds for which to display the Bitmap target 1013. |
| Sync | Check Box | Specifies whether the hypervideo should stop executing, or playing, until the bitmap target 1013 is no longer displayed. The default setting is TRUE. A FALSE setting does not allow the Back option to be set for the Ending parameter. |
| Ending | Combo Box | Indicates what to do when the bitmap target 1013 is no longer displayed. The options are:<br>Back - Goes back to the source from which the video target 1011 originated. This option is not applicable in the case when the Sync parameter is set to FALSE.<br>Exit - Exits the hypervideo project player.<br>Continue - Terminates the Bitmap target 1013 and proceeds to the next target. This is the only option that lets the user choose a new target after the bitmap is displayed. |

When a bitmap target 1013 appears or disappears from the display window, transition effects, including, but not limited to, the following, can be selected. The bitmap may grow from the middle or side of the display window. The bitmap may slide from the side of the display window. The bitmap may evolve from the hotspot. Finally, the bitmap may spirally grow on the display window. These effects can be implemented for videos also.

Audio Targets

| Name | Type | Description |
|---|---|---|
| Sync | Check Box | Specifies whether the hypervideo plays or pauses while the audio target 1015 plays. |
| Mix | Check Box | Indicates whether to mix the audio data with other data that is presently playing, or play the audio data "on top" of other data. |
| Ending | Combo Box | Indicates what to do when the audio target 1015 ends playing. The options are:<br>Loop - Loops the audio target 1015 back and forth.<br>Back - Goes back to the source from which the video target 1011 originated<br>Exit - Exits the hypervideo project player.<br>Continue - Terminates the audio target 1015 and proceeds to the next target. This is the only option that lets the user choose a new target after the audio target 1015 has played.<br>The default is Continue. |

Audio targets 1015 can include the transition effects of fading in and out.

Mixing of Several Audio Channels

Audio tracks of several different media playing simultaneously may be mixed together.

Text Targets

| Name | Type | Description |
|---|---|---|
| Position | RECT. | The run-time module 1101 needs the top left coordinates and the width and height of the bitmap window. The RECT contains the format: left top width height. In case width and height are absent, the default is the original size of the bitmap. |
| Font | Combo Box | The name of the font. Default may be Arial. |
| Size | Combo Box | The size of the text. |
| Duration | Milliseconds | The duration in milliseconds that the text target 1017 is displayed. |
| Infinite | Check Box | Toggle between this parameter and the Duration parameter. When the user specifies the Infinite parameter, the message pops up as a message box and the user may actuate an OK button in order to exit this message box. |
| Sync | Check Box | Specifies whether the hypervideo should stop and wait for the duration of displaying the text to pass. The default is TRUE. In case the Infinite flag is ON, the Sync flag turns ON too. |
| Ending | Combo Box | Indicates how to terminate the display of a text target 1017. The options are: Back- Goes back to the source from which the video target 1011 originated. Exit - exits the hypervideo project player. Continue - Terminates the text target and proceeds to the next target. This is the only option that lets the user choose a new target after the text target 1017 has been displayed. The default option is Continue. |

Text targets 1017 can include the transition effect of evolving letter by letter.

Executable Targets

| Name | Type | Description |
|---|---|---|
| Command Line | Edit Box | Text describing the command line for the executable target 1021. |
| Position | RECT. | The run-time module 1101 needs the top left coordinates and the width and height of the executable window. The RECT contains the format: left top width height. |
| Sync | Check Box | Specifies whether the hypervideo should stop and wait for the duration of opening the executable target 1021 to pass. The default is TRUE. |
| Ending | Combo Box | indicates what to do when the executable target 1021 ends execution. The options are: Back - Goes back to the source from which the video target 1011 originated. Exit - exits the hypervideo project player. Continue - Terminates the executable target 1021 and proceeds to the next target. This is the only option that lets the user choose a new target after the executable target 1021 is performed. The default is Continue. |

Editing Options

The workshop window supports the following editing options:

Selection—different types are available:
　One hotspot 8003 in one frame;
　Multiple hotspots 8003 in one frame;
　One hotspot 8003 over multiple frames (using the shift key, and the slider or arrow keys); and
　Multiple hotspots 8003 over multiple frames.

Undo and Redo—for:
　Deleting a hotspot 8003;
　Editing, such as cutting, copying and pasting;
　Defining a hotspot 8003 in more frames;
　Defining a new hotspot 8003; and
　Moving a hotspot 8003.

Cut, Copy, Paste and Paste New—implemented to work for one or more selected hotspots for one or more frames. A user can cut and copy a selected hotspot and paste it on a different frame. Hotspots 8003 created with the paste command retain their original identity. However, hotspots 8003 created with the Paste New command have new identities.

Delete and Delete Hotspot—will delete selected or entire instances of a hotspot 8003 in a media element 1690. Deletion can be performed on selected hotspots. When deleting all instances of a hotspot 8003, the hotspot will automatically be deleted throughout the media element 1690. When deleting selected instances of a hotspot 8003 in the authoring tool 1001, the hotspot must remain selected.

Alternate Mouse Button

By actuating the alternate mouse button, different sets of commands can be accessed. The type of command set accessed depends upon whether or not the pointer is over a hotspot 8003. When the pointer is over a hotspot 8003, the alternate mouse button may access the following commands:

Hotspot Properties
Go To First Frame
Cut
Copy
Paste
Delete One
Delete Hotspot 8003
Bring To Front (see following Z-order of hotspots section)
Send To Back (see following Z-order of hotspots section)

When the cursor is not over a hotspot 8003, actuating the alternate mouse button may access the following commands:

Workshop Properties
Snap/Stretch
Different sizes of the Workshop video
Preview
Set In Frame
Set Out Frame
Go To In Frame
Go To Out Frame
Z-Order of Hotspots Hotspots 8003 should maintain a z-order among themselves when one hotspot 8003 overlaps another hotspot 8003. The user may place one hotspot 8003 in back or in front of another hotspot 8003. Selecting a hotspot 8003 will not automatically bring it to the top of the z-order. This option may be supported by one or more of the following portions of the hypervideo environment 1000: the project file 1670, the authoring tool 1101, or the run-time module 1101.

Video Preview

The Workshop window may provide the option to preview a hypervideo being edited in that window.

The Slider

The slider 6007 in the Workshop window permits the user to select and display one frame of a video.

Floating Toolbars

The Workshop Toolbar and Hotspot Toolbar may be floating. The toolbars can hook to the sides of the Workshop window. The orientation of the toolbars may be changed from horizontal to vertical. The toolbars may be displayed in a double vertical format. The interpolation buttons may be placed in the Workshop Toolbar.

Authoring Tool GUI

Figure 10:
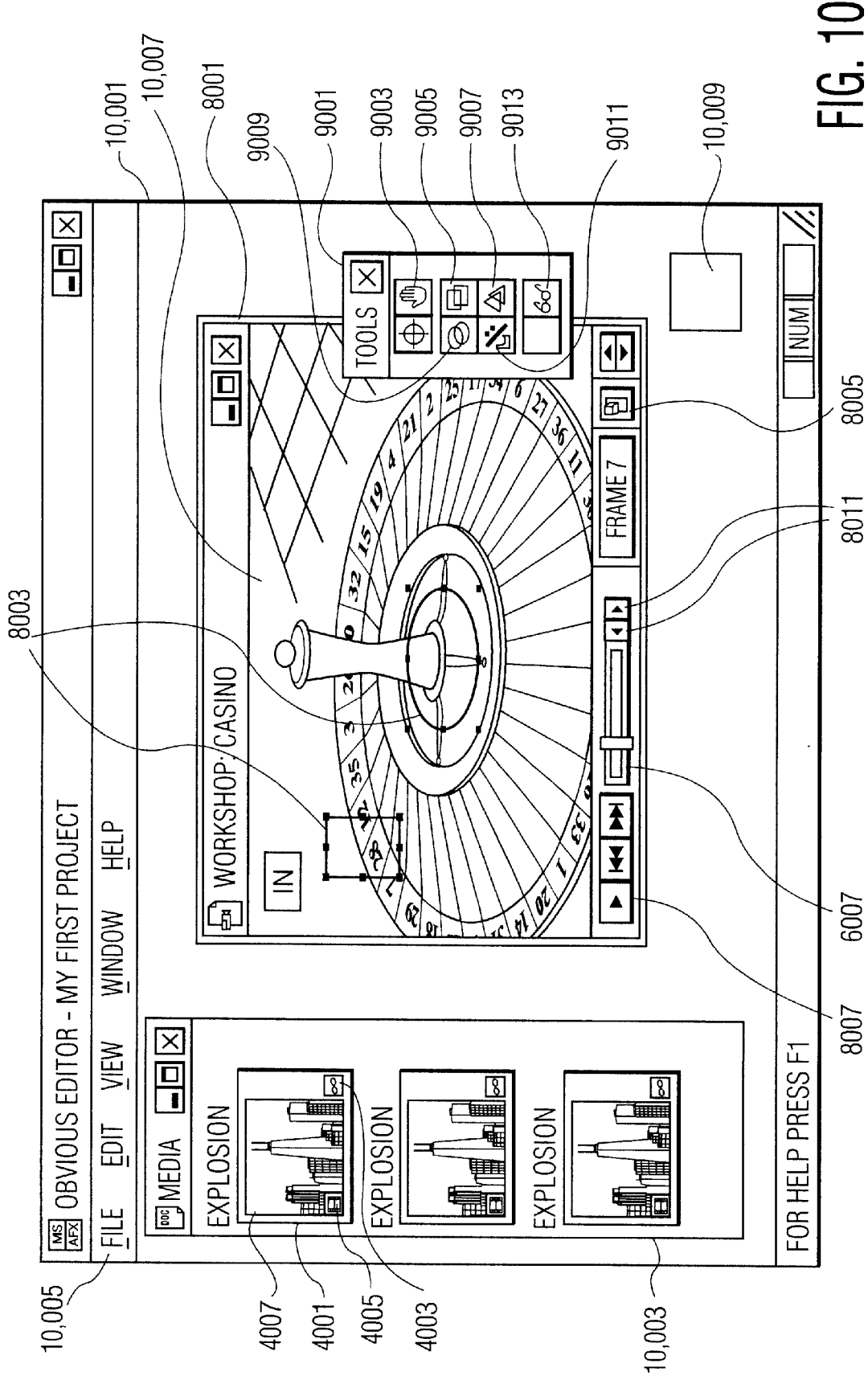
FIG. 10 illustrates an exemplary graphical user interface for the hypervideo authoring tool.

FIG. 10 illustrates an exemplary graphical user interface (GUI) 10,001 of the authoring tool 1001. The authoring tool's GUI 10,001 includes the menu bar 10,005, the main tool bar 10,009, the Media Warehouse window 10,003, the Workshop window 8001, and the Tools window 9001. A hypervideo 10,007 is shown in the Workshop window 8001.

2.15 Project View

Figure 11:
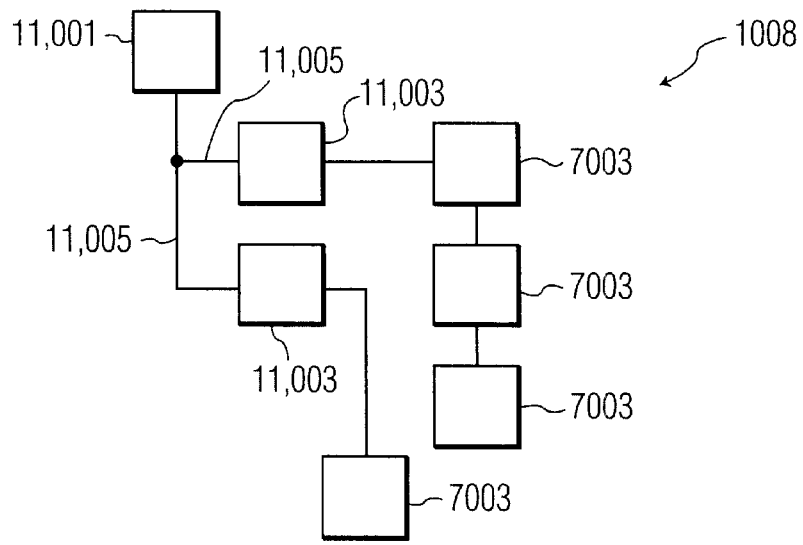
FIG. 11 illustrates an exemplary hypervideo story board.

The project view 1007 illustrates the hypervideo story board 1116, shown in FIG. 11, which illustrates the base target 11,001 and targets 7003 linked 1010 to hotspots 8003. Icons 11,003 illustrating a thumbnail illustration 4007 of hotspots 8003 in the targets 7003, 11,001 are appended to the corresponding base target 11,001 and other targets 7003. Targets 7003 corresponding to the hotspots 8003 illustrated by the icons 11,003 may then be appended to the icons 11,003. The branch 11,005 of an icon 11,003 that has already been displayed in the story board 1116 may terminate. Branches 11,005 to targets 7003 of newly displayed icons are shown. In this way, the user can view the hotspots 8003 and targets 7003 of all media elements 1690 in the hypervideo project.

2.2 Run-Time Module

The run-time module 1101, illustrated in FIG. 1B, is used to play one or more hypervideos simultaneously. The run-time module 1101 utilizes the data in the project file 1670. The run-time module 1101 can be used to play hypervideos 10,007 with different applications, including, but not limited to, Director5 by Macromedia Incorporated (San Francisco Calif.), Shockwave by Macromedia Incorporated, VDOLive by VDOnet Corporation (Palo Alto, Calif.), Netscape Navigator by Netscape Communications Corporation (Mountain View, Calif.), and Internet Explorer by Microsoft. By communicating with the run-time library 1113 through player interfaces 1102, the different applications use the run-time module 1101 to play hypervideos 10,007.

The player interfaces 1102 include, for example:

(1) plug-ins 1103 for applications such as those described above (e.g., Director5 and Netscape);

(2) OLE control, such as ActiveX (OCX), 1105, for example, to integrate with Visual Basic environments by Microsoft Corporation;

(3) stand-alone modules 1107 such as a stand-alone player incorporating the player interface 1102;

(4) an MCI driver 1109 accessible by MCI; and (5) a software development kit (SDK) 1111.

The run-time library 1113 permits the hypervideos 10,007 to be played. The run-time library 1113. may include four elements, exemplified below:

(1) Execution of a hypervideo project by a project interpreter 1117. The project interpreter 1117 manipulates an object database 1127. The object database 1127 may include an object tree which will be subsequently described. Logging information and preparing statistics 1147 pertaining to the hypervideo project execution can be recorded.

(2) Administration including manipulation, for example, of media necessary for the execution of a hypervideo project is provided by a media manager 1125, including an active media stack 1141, a cache 1143 of media that have been previously activated, and a look ahead system 1145 containing media that are expected to be activated. The media manager 1125 is used to manipulate media files, e.g., opening, playing and closing media files 1680. The media manager 1125 reduces the time to open a file, by keeping track of the opened files and using the look-ahead system 1145 to load new media files 1680 that may potentially be requested by the user. The newly loaded files are added to the object tree, subsequently described.

(3) Manipulation of the hypervideo project, for example, including the object database 1127, can be achieved through an interface 1119 by activation feedback 1129, and display and sound mechanisms 1131 Activation feedback 1129 permits control of the hypervideo project by user or programmatic actions 1149, 1151. Programmatic actions 1151 may be implemented in software, such as by the use of scripting languages 1004. A programmatic action 1151 may include the use of notification frames 1157, subsequently described. A user action 1149 may include actuating a hotspot 8003, while a hypervideo project is being displayed, by, for example, actuating a mouse button, when the pointer is over the hotspot. As a result, a target 7003, such as a media element 1690, may be executed.

(4) Network communications capability 1115, for example on the Internet or an Intranet, that permits implementing the run-time module 1101 in a client-server architecture 1121. The client-server architecture 1121 may permit the run-time module 1101 to support multiple users 1133. The client-server architecture 1121 may also permit the run-time module 1101 to support streaming of video and other meta-information. A queue manager 1137 manages a stream of information, including hypervideo information, being transmitted between the client and the server 1121.

2.21 Run-Time Module Commands

The run-time module 1101 may support the following commands:

Open project—Loads a specified hypervideo project (.OBV) file 1670. This operation may also modify the display window of the hypervideo project according to submitted window parameters. The window parameters include window size, position, z-order and hierarchical status.

Play project—Activates a previously loaded hypervideo project. A call-back object 12,001 may be supplied when using this command.

Stop project—Stops a playing hypervideo project.

Pause project—Pauses a playing hypervideo project.

Set Project Window Properties—Window properties of an open project may be altered. These properties include window size, position, z-order and hierarchical status.

Add\Remove A Call-Back Object—Call-back objects may be added or removed.

2.22 Run-Time Module Design

An exemplary design of the run-time module 1101 will now be described. This description will include an illustrative discussion of call-back objects, a player interface 1102, and the run-time library 1113.

Call-back Objects

Figure 12:
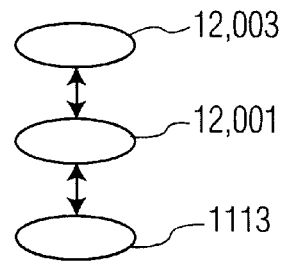
FIG. 12 illustrates an exemplary call-back object.

An application may include a call-back object 12,001, exemplified in FIG. 12. Call-back objects are otherwise known as call-back windows or call-back functions. The call-back objects 12,001 couple the run-time library 1113 to an application 12,003, which may include the stand-alone module 1107 or other applications described above. Specifically, the call-back objects 12,001 facilitate communications between the run-time library 11 13, and the application 12,003. A call-back object 12,001 receives information, in the form of messages or function calls, upon the occurrence of certain events when a hypervideo 10,007 is performed. The call-back object 12,001 communicates the information to the application 12,003. The events are listed in the following section describing Event Notification 1114. Furthermore, the application 12,003 can initiate actions in a hypervideo 10,007 through a call-back object 12,001. The use of the term object in this paragraph and subsequently in the text refers, not to hotspots 8003, but to objects in object oriented programs.

Event Notification

The run-time library 1113 supports notification of call-back objects 12,001 upon the occurrence of certain events (1114). Upon such event notification 1114, call-back objects may present certain return values to the run-time library 1113, or initiating actions of the type listed below. Events include:

Hotspot related events—these events include:
  Entrance of a hotspot 8003 into a frame that is the first frame in which the hotspot 8003 is defined.
  Exit of a hotspot 8003 from a frame that is the first frame in which the hotspot is not defined.
  Activation of a hotspot 8003, when a user activates a mouse. button when the pointer is over the hotspot 8003 in a certain frame.
  Passing over a hotspot 8003, when the pointer is moved over a hotspot 8003. Hotspots may respond to this notification, for example, by specifying a cursor to be displayed.
Call-back objects 12,001 may respond to any one of these hotspot-related events.

Media Related Events—These events include:
  Start or end of a media, when a media is activated or deactivated. The start and end of the media may not be the first and last frames of the media, but rather the first and last frames of the media that are displayed.
  Reaching certain marked frames or other previously marked points. Certain frames of a media may be marked during hypervideo project authoring, or during run-time, as notification frames 1157. When notification frames 1157 are executed or displayed, the run-time library 1113 notifies the call-back objects 12,001.

Target Related Events—Specific targets may be marked for notification. Before activating, or executing, such targets 7003, call-back objects 12,001 are notified. This notification allows the hypervideo 10,007 to abort the target 7003 execution or commence different related actions.

Initiated Actions

When a hypervideo 10,007 is playing, applications 12,003 which reference the hypervideo project may initiate two kinds of actions:

1. Actions that have a direct and apparent influence on the playing hypervideo 10,007. These actions include:
  Target 7003 Activation—whereby an application 12,003 can force the playing hypervideo 10,007 to launch, or execute, a certain target by creating a new target 7003 or by activating, or actuating, a hotspot 8003 linked 1010 to a previously defined target 7003.
  Project Stop—whereby an application 12,003 can force a playing hypervideo 10,007 to stop.

2. Actions directed at the project file 1670 that have an indirect influence on a playing hypervideo 10,007. These actions include:

Changing cursors—an application 12,003 may change the cursors associated with a particular hotspot. These cursors include cursors that are used when a pointer is passed over the hotspot 8003 or when a mouse button is actuated when the pointer is over the hotspot 8003.

Enabling or disabling hotspots 8003—an application 12,003 can disable or enable a hotspot 8003. A hotspot 8003 can be fully or partially disabled. With full disabling, a defined hotspot 8003 is completely ignored. With partial disabling, specific hotspot 8003 functions are disabled, such as predefined targets 7003, notification, and hotspot visualization 1155, for example.

Replacing the base targets 11,001—whereby an application 12,003 can redefine the hypervideo base targets 11,001 which are played when the hypervideo 10,007 begins. This function may be invalid once hypervideo 10,007 has commenced playing.

Marking notification frames 1157—whereby at run time, the application 12,003 marks frames for which notification is requested.

Querying the media and media position—whereby an application 12,003 can retrieve at any given time the currently playing media(s) and its/their current position (s) (e.g., frame or time).

MCI Driver

The run-time module 1101 may include an MCI Driver 1109 as one of the player interfaces 1102 to permit the playing of hypervideos 10,007. The MCI driver 1109 may allow Window applications to play hypervideos 10,007, using the Multimedia Control Interface (MCI) by Microsoft. An application 12,003, requesting to play a hypervideo 10,007, may send the appropriate MCI commands. The MCI may translate these commands into messages and send them to the MCI driver 1109 corresponding to the file type that is being acted upon. The corresponding MCI driver 1109 may recognize these messages and direct the run-time library 1113 appropriately. The MCI driver 1109 may also process user input, for example, from a mouse or a keyboard.

In order to respond correctly to both sources of input, the MCI driver 1109 includes the following two components:

(1) A driver procedure which responds to relevant messages sent by the system; and (2) A window procedure attached to a window. This procedure is designed to trap relevant mouse messages, and to serve as a call-back object 12,001 for notifications sent by the playing media elements 1690.

Figure 13:
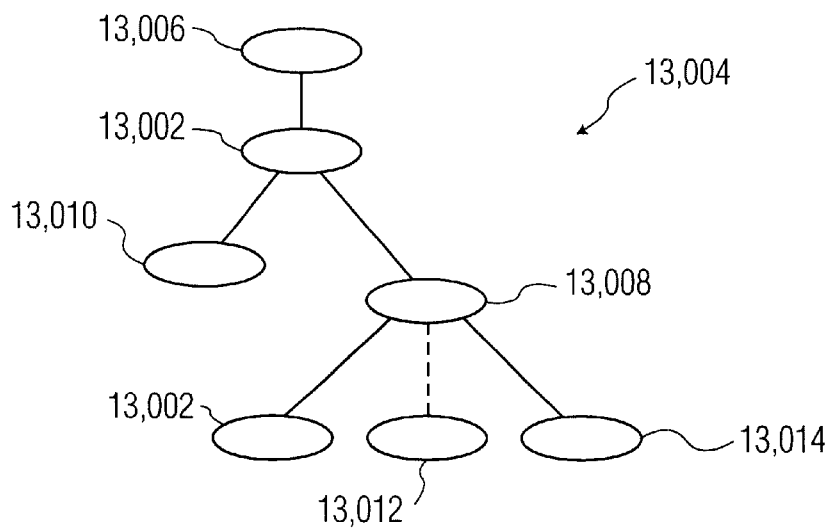
FIG. 13 illustrates an exemplary object tree.

In order to accomplish their tasks, the components use a set of hypervideo objects created and used by the run-time library 1113. Any time a target 7003 has to be executed as a result of activation feedback 1129, an object is constructed. These objects include information about a corresponding target 7003. The objects that are playing or that were playing and may be played in the future, are kept in an object tree. In this object tree, objects that were activated from other objects are depicted as their descendants. FIG. 13 illustrates exemplary objects 13,002 in an exemplary object tree 13,004. The objects 13,002 and object tree 13,004 may also be used with player interfaces 1102, including the MCI driver 1109, described above. The MCI driver and window procedures will now be described in more detail to exemplify the use of objects 13,002 and the object tree 13,004.

MCI Driver Procedure

The MCI driver 1109 may be designed to respond to the messages sent to it by the system. These messages may include general driver messages, and MCI-specific messages. The MCI messages are interpretations of the messages sent by an application. The messages handled by the driver include: MCI_OPEN, MCI_PLAY, MCI_STOP, MCI_PAUSE, MCI_RESUME, MCI_WINDOW, MCI_CLOSE, MCI_PUT, and MCI_UPDATE. Custom messages may be developed to enable seeking specific clips in given frames or targets 7003. An exemplary description of some of the messages follows:

MCI_OPEN (relevant parameters: Open-Flags, Open-Parms):

This message initiates the hypervideo 10,007 according to the file name found in the Open-Parms. When processing this message, the base target 11,001 to be played becomes the root object 13,006 of the object tree 13,004. According to the Open-Flags and Open-Parms, a window is created. The window's procedure is set to be the driver's WndProc.

MCI_PLAY:

This message starts playing the hypervideo 10,007. The message can be received, for example, upon one of the following situations arising: (1) The project is stopped—In this case the object tree 13,004 is,initiated from the root object 13,006. The base target 11,001, corresponding to the root target 13,006 is thus played. (2) The project is paused—In this case all the objects 13,002, or corresponding targets 7003, which have the status flag Playing (e.g., were previously playing, see MCI_PAUSE) are played.

MCI_STOP:

The hypervideo 10,007 and all of its playing targets 7003 are stopped, and the object tree 13,004 is collapsed.

MCI_PAUSE:

The hypervideo 10,007 and all of its playing targets are paused. Pausing does not affect the status flag of the objects 13,002. Thus, when resuming the playing of the hypervideo 10,007, the run-time module 1101 knows which objects 13,002 to resume playing. There is no effect. on the object tree 13,004.

MCI_RESUME:

This message is effective only if the hypervideo 10,007 is paused. In this case all the objects 13,002 of the hypervideo 10,007 marked Playing are played.

MCI_WINDOW (relevant parameters: window):

This message replaces the window relating to the 'full-screen' of the MCI driver 1109. It can be sent only when the MCI driver 1109 is not playing.

The window is attached to the root object 13,006, and is subclassed to WndProc.

MCI_CLOSE:

This message releases all memory, and terminates the MCI driver 1109.

Window Procedure

Each driver session is associated with a window. The association is made by means of the MCI_OPEN and MCI_WINDOW commands. The association must be done before playing starts. The driver uses the window procedure to obtain mouse and MCI events. In case the driver is assigned a new window using the MCI_WINDOW command, it will subclass its window procedure. Any other child windows which are created during the playing of the hypervideo 10,007 are also subclassed to this same procedure, and the interaction with them is done through it.

The main messages handled by the window procedure are:

WM_LBUTTONDOWN (relevant parameters: window, mouse position):

This message is used to identify user action of actuating a mouse button. From the window handle, the object 13,002 can be retrieved via the management manager 1125. After identifying the object 13,002 and the pointer coordinates, the object database 1127 is queried for a target 7003, or object 13,002, to be executed. According to the data received from the object database 1127, the current object 13,002 may be stopped.

WM_SETCURSOR (relevant parameters: window):

This message is used to set the cursor according to the pointer coordinates, whether the pointer is over a hotspot 8003, whether a mouse button has been actuated, and depending upon the media element 1690 being executed.

From the window handle, the object 13,002 can be retrieved via the management system.

MM_MCINOTIFY (relevant parameters: device ID):

This message is used to signal that an object 13,002 has terminated. From the device ID, the object 13,002 is retrieved via the media management system 1125. Notification of medias that terminated unsuccessfully may be ignored at this stage. The object 13,002 that ended is updated to show that the corresponding media file 1680 is no longer playing. For compound objects, this may not necessarily mean that the object 13,002 has terminated. If the object 13,002 is terminated, then a check is performed on the object's termination flag, or ending parameter, previously described. The following actions are taken according to the following flag settings:

if EXIT stop all playing target(s) 7003.
if LOOP play target(s) 7003 again.
if CONTINUE stop target(s) 7003 and take it/them off the active media stack 1141. Get the next object 13,002 and play it.
if BACK stop target(s) 7003 and take it/them off the active media stack 1141. Continue the parent object or target.
if FREEZE pause target 7003.

MM_MCISIGNAL (relevant parameters: device ID, video position):

This message is used to track a playing object 13,002. Again, the object 13,002 may be retrieved from the device ID. Tracking a playing object 13,002 permits the following:

1. Since the image in a video, for example, may change, the cursor may have to be altered even though the mouse has not moved. For that reason, it may not be sufficient to wait for the WM_SETCURSOR message.
2. Identifying notification frames 1157. For each frame, the object database 1127 is queried to determine if the frame is a notification frame 1157. If the frame is a notification frame 1157, the corresponding target(s) are executed.
3. Logging, for example in a database, the entrance, or appearance, and exit, or disappearance, of hotspots 8003.

An object 13,002 always keeps its position, for example frame number, of its last signal message. When such a signal message is received, the object 13,002 is queried by itself for changes that occurred between the last kept and current position.

WM_TIMER (relevant parameters: device)

This message is used to signal that a timed object has terminated. The action is similar to the notify message.

Objects and the Object Tree

The object 13,002 includes a description of a corresponding target 7003. Additionally, the object also may include status information, such as playing status, the MCI device ID and relevant window.

The objects 13,002, or corresponding targets 7003, that are being executed, or that were executed and still may at anytime in the future be executed may be kept in an object tree 13,004 The objects 13,002 of the object tree 13,004 may be of two general types: visible 13,008 or invisible 13,010. The visible objects 13,008, unlike invisible objects 13,010, can serve as parents of other objects 13,002. Invisible objects 13,010 are always leaves.

An object 13,002 may be added to the object tree 13,004 once the object 13,002 starts playing. The object 13,002 is removed from the object tree 13,004 once the object 13,002 is no longer scheduled to be played. An object 13,002 may be added to the object tree 13,004 in the following situations:

1. When starting to play the hypervideo 10,007, a root object 13,006, representing the base target(s) 11,001, is created and is placed at the top of the object tree 13,004.
2. As a result of actuating a switch, or button, on a mouse or reaching a notification frame 1157, an object 13,002 is spawned from the object 13,002 that contains, for example, the hotspot 8003 over which the pointer was placed when the switch was actuated, or clicked.
3. If an object 13,002 ends or is closed, and its termination flag is set to continue, the closed object 13,012 is destroyed and a new object 13,014 is placed as a son of the closed object's parent object.

An object 13,002 may be removed from the object tree 13,004 in the following situations:

a. When the hypervideo 10,007 reaches its end or the close command is received, the object tree 13,004 is terminated.
b. If an object 13,002 terminates and the termination flag is set to continue (used to activate new object 13,014) or to back (used for asynchronous objects to continue playing their parent object).

Objects 13,002 removed from object tree 13,004 may be marked in one of two ways: (1) stop all the playing descendant object(s) or (2) do not stop all playing descendant object(s). If an object 13,002 of the first type (1) is removed from the object tree 13,004, then descendent object(s) that branch from the removed object are also removed from the object tree 13,004. If the object 13,002 of the second type (2), is removed from the object tree 13,004, then branch(es) of descendent object(s) of the removed object are appended to the parent object of the removed object.

Media Manager

The media manager 1125 includes a list of media file 1680 names. The media manager 1125 also includes an MCI device ID for each media file 1680 in the list. The media manager 1125 further includes a list of objects 13,002 that use those device IDs. As a result, the objects 13,002 can interact with the MCI.

The media manager 1125 supports the following commands:

Open (media file, object reference, window)—this command opens a media file 1680 in a specified window and returns the MCI device ID of the opened media file 1680. If a copy of the specified media file 1680 has previously been opened and is available, the same media file 1680 copy and MCI device ID will be used.

Stop (object reference)—stops the playing of the media file 1680 relating to the object reference.

Close (object reference)—removes the object.

Database Resolution

Resolution of a hypervideo project may be 1000 by 1000. To optimize the speed of database calculations, the resolution may be 1024 by 1024. Also, the user can change the resolution of the hypervideo project coordinates.

Pointer Location

The Microsoft Foundation Class (MFC) CRgn objects may be used to determine whether the pointer is positioned over a polygon-shaped hotspot.

Overlaying Displayed Media Files

Two or more media files 1680 may be displayed overlapping each other. A z-order relationship is maintained between the media files 1680 so that they are displayed over one another in a consistent fashion. Special overlay techniques, such as key color, blue screen and alpha channel may be used to achieve sprite animation and non-rectangular overlaps of windows.

Hotspot Visualization

A marker 1155 can be attached to a hotspot 8003 (i.e., the hotspot 8003 can be marked). The marker 1155 can serve two purposes: First, the marker 1155 signals the user that a hotspot 8003 exists. Second, the marker 1155 can signify that the user has already actuated the hotspot 8003.

To facilitate these purposes, the marker 1155 can be attached to the hotspot 8003 in one of the following ways:

Statically by showing the marker continuously. The marker 1155 can be turned on or off by an application 12,003, such as a monitoring application; or Dynamically when, for example, the hotspot 8003 is actuated by an application 12,003, such as a monitoring application, or when a pointer is over the hotspot 8003.

The marker 1155 may be implemented using one of the following techniques:

(a) A text tag attached to the hotspot 8003;
(b) A bitmap tag attached to the hotspot 8003;
(c) Overlapping the hotspot 8003 with a surface, such as a translucent surface to highlight the hotspot 8003;
(d) With sprite animation; and
(e) With tool tips. When a mouse moves over a hotspot 8003, a tool tip may pop up to specify, for example, the hotspot's name.

Run-time Statistics

Statistics 1147 are gathered for hotspots and media files 1680. Statistics 1147, for example, include the number of times a hotspot 8003 has been activated or the number of times a particular media file 1680 was played. The statistics 1147 can be accessed used by applications 12,003, such as monitoring applications, to initiate conditioned actions. The statistics mechanism can be replaced, at least partially, by a counting mechanism in the application 12,003 that is triggered by event notification 1114. Additionally, statistics 1147 can be displayed.

Project Status

The current status of a project, including currently playing media, for example, defined by the object tree 13,004 and those waiting in the active media stack 1141, can be saved by the run-time library 1113. The saved status can later be recalled to continue playing a project from a specific point.

3.0 Conclusion

The present invention is a system and method for authoring and playing hypervideo 10,007. The present invention permits creating hyperlinks in select regions of interest in frames of a video, defined by hotspots. It is understood that the above description is intended to be illustrative, and not restrictive. Many embodiments will be apparent to those skilled in the art upon reviewing the above description. For example, other implementations of computers, using state machines, parallel processors, client-server architectures, or combinations thereof, may be utilized. Pointing devices, other than mouses, such as pens, joysticks, trackballs and even human fingers, may be used. Displays for televisions and computers, may include, but are not limited to, cathode ray tubes, plasma displays, and liquid crystal displays. The televisions may utilize either analog or digital modulation. The buttons, for example on a mouse, may be any type of switch. Switches may also be implemented with capacitively actuated touch screens. The networks may be computer or broadcast (e.g., television broadcast) networks. Hence, the scope of the invention should, therefore, be determined with reference to the appended claims, along with the full scope of equivalents to which such claims are entitled.

We claim:

1. A computer program product comprising memory having computer program logic recorded thereon for enabling a processor in a computer system to link information, the computer program logic comprising:
   a defining process enabling the processor to define a hotspot in a frame of a video;
   a linking process enabling the processor to link the hotspot to a plurality of targets on one or more levels;
   a first tracking process enabling the processor to track the hotspot in another frame of the video; and
   a second tracking process enabling the processor to track the hotspot automatically, wherein the second tracking process comprises;
   a selective enumeration process enabling the processor to selectively enumerate the hotspot;
   a scoring process enabling the processor to score each enumeration of the hotspot; and
   a selecting process enabling the processor to select the enumeration of the hotspot having the best score.

2. The computer program product of claim 1, wherein the selective enumeration process comprises:
   a second selective enumeration process enabling the processor to selectively enumerate position of the hotspot; and
   a third selective enumeration process enabling the processor to selectively enumerate size of the hotspot.

3. The computer program product of claim 1, wherein the scoring process comprises a comparing process enabling the processor to compare the luminance delta of corresponding pixels in the frame and another frame.

4. The computer program produce of claim 1, wherein the scoring process comprises a comparing process enabling the processor to compare each enumeration of the hotspot in another frame with a signature of the hotspot in the frame.

5. The computer program product of claim 1, further comprising a filtering process enabling the processor to filter the frame.

6. The computer program product of claim 1, further comprising a declaring process enabling the processor to declare tracking failure.

7. The computer program product of claim 1, wherein the scoring process comprises a comparing process enabling the processor to compare the RGB delta of corresponding pixels in the frame and the another frame.

8. A computer system comprising:
   a processor;
   a memory, operatively coupled to the processor;
   a defining process enabling the processor to define a hotspot in a frame of a video;
   a linking process enabling the processor to link the hotspot to a plurality of targets on one or more levels;
   a first tracking process enabling the processor to track the hotspot in another fame of the video; and
   a second tracking process enabling the processor to track the hotspot automatically, wherein the second tracking process comprises:
   a selective enumeration process enabling the processor to selectively enumerate the hotspot;
   a scoring process enabling the processor to score each enumeration of the hotspot; and
   a selecting process enabling the processor to select the enumeration of the hotspot having the best score.

9. The computer system of claim 8, wherein the selective enumeration process, comprises:
   a second selective enumeration process enabling the processor to selectively enumerate position of the hotspot; and
   a third selective enumeration process enabling the processor to selectively enumerate size of the hotspot.

10. The computer system of claim 8, wherein the scoring process comprises a comparing process enabling the processor to compare the luminance delta of corresponding pixels in the frame and another frame.

11. The computer system of claim 8, wherein the scoring process comprises a comparing process enabling the processor to compare each enumeration of the hotspot in another frame with a signature of the hotspot in the frame.

12. The computer system of claim 8, further comprising a filtering process enabling the processor to filter the frame.

13. The computer system of claim 8, further comprising a declaring process enabling the processor to declare tracking failure.

14. The computer system of claim 8, wherein the scoring process comprises a comparing process enabling the processor to compare the RGB delta of corresponding pixels in the frame and the another frame.

15. A computer program product comprising memory having computer program logic recorded thereon for enabling a processor in a computer system to link information, the computer program logic comprising:
   a first defining process enabling the processor to define a hotspot in a frame of a video;
   a second defining process enabling the processor to define a plurality of targets, each of which defines a playing instance of a media element;
   a third defining process enabling the processor to define one or more levels for each target to permit said plurality of targets to be executed simultaneously, sequentially, or both simultaneously and sequentially;
   a linking process enabling the processor to link the hotspot to said plurality of targets for the execution of said plurality of targets on the one or more levels; and
   a tracking process enabling the processor to track the hotspot in another frame of the video,
   wherein the tracking process comprises a second tracking process enabling the processor to track the hotspot automatically, said second tracking process comprising:
   a selective enumeration process enabling the processor to selectively enumerate the hotspot;
   a scoring process enabling the processor to score each enumeration of the hotspot; and
   a selecting process enabling the processor to select the enumeration of the hotspot having the best score.

16. The computer program product of claim 15, wherein the linking process comprises:
   a first selecting process enabling the processor to select the hotspot;
   a second process enabling the processor to select the set target mode; and
   a dragging process enabling the processor to drag a cursor to a media element that is to be the target.

17. The computer program product of claim 15, wherein the first defining process enables the processor to define the hotspot manually.

18. The computer program product of claim 17, wherein the defining process enables the processor to define the hotspot with a primitive shape.

19. The computer program product of claim 17, wherein the defining process enables the processor to define the hotspot by identifying vertices that form a polygon.

20. The computer program product of claim 15, wherein the first defining process enables the processor to define the hotspot automatically.

21. The computer program product of claim 20, wherein the defining process enables the processor to define the hotspot automatically with a flood-filled algorithm.

22. The computer program product of claim 20, wherein the defining process enables the processor to define the hotspot automatically with a rays algorithm.

23. The computer program product of claim 15, wherein the tracking process comprises a second tracking process enabling the processor to track the hotspot manually.

24. The computer program product of claim 23, wherein the second tracking process enables the processor to automatically track the location of the hotspot.

25. The computer program product of claim 24, wherein the second tracking process enables the processor to automatically track the size of the hotspot.

26. The computer program product of claim 15, wherein the selective enumeration process comprises:
   a second selective enumeration process enabling the processor to selectively enumerate position of the hotspot; and
   a third selective enumeration process enabling the processor to selectively enumerate size of the hotspot.

27. The computer program product of claim 15, wherein the scoring process comprises a comparing process enabling the processor to compare the luminance delta of corresponding pixels in the frame and the another frame.

28. The computer program product of claim 15, wherein the scoring process comprises a comparing process enabling the processor to compare each enumeration of the hotspot in the another frame with a signature of the hotspot in the frame.

29. The computer program product of claim 15, further comprising a filtering process enabling the processor to filter the frame.

30. The computer program product of claim 15, further comprising a declaring process enabling the processor to declare tracking failure.

31. The computer program product of claim 15, further comprising:
   a second defining process enabling the processor to define the hotspot in a second frame of video; and
   an interpolating process enabling the processor to interpolate the position and size of the hotspot in intermediate frames of video between the frame and the second frame.

32. The computer program product of claim 15, wherein the scoring process comprises a comparing process enabling the processor to compare the RGB delta of corresponding pixels in the frame and the another frame.

33. The computer program product of claim 15, wherein the linking process further comprises a second linking process enabling the processor to link the hotspot to two or more of the plurality of targets on two or more levels.

34. The computer program product of claim 15, wherein the linking process further comprises a second linking process to link the hotspot to at least two or more of the plurality of targets on one level.

35. The computer program product of claim 34, wherein the second linking process comprises a third linking process enabling the processor to link the hotspot to two or more of the plurality of targets on two or more levels.

36. The computer program product of claim 34, wherein the second linking process further comprises a designating process enabling the processor to designate at least one of the at least two or more of the plurality of targets as a leader target.

37. The computer program product of claim 15, wherein the video is a target in another plurality of targets on one or more levels.

38. The computer program product of claim 37, wherein the another plurality of targets are base targets.

39. A computer system, comprising:
   a processor;
   a memory, operatively coupled to the processor;
   a defining process enabling the processor to define a hotspot in a frame of a video,
   a defining process enabling the processor to define a plurality of targets, each of which defines a playing instance of a media element;
   a defining process enabling the processor to define one or more levels for each target to permit said plurality of targets to be executed simultaneously, sequentially, or both simultaneously and sequentially;
   a linking process enabling the processor to link the hotspot to said plurality of targets for the execution of said plurality of targets in the one or more levels; and
   a tracking process enabling the processor to track the hotspot in another frame of video,
   wherein the tracking process comprises a second tracking process enabling the processor to track the hotspot automatically, said second tracking process comprising:
      a selective enumeration process cabling the processor to selectively enumerate the hotspot;
      a scoring process enabling the processor to score each enumeration of the hotspot; and
      a selective process enabling the processor to select the enumeration of the hotspot having the best score.

40. The computer system of claim 39, wherein the linking process comprises:
   a first selecting process enabling the processor to select the hotspot;
   a second process enabling the processor to select the set target mode; and
   a dragging process enabling the processor to drag a cursor to a media element that is to be the target.

41. The computer system of claim 39, wherein the defining process comprises a second defining process enabling the processor to define the hotspot manually.

42. The computer system of claim 41, wherein the second defining process comprises a third defining process enabling the processor to define the hotspot with a primitive shape.

43. The computer system of claim 41, wherein the second defining process comprises a third defining process enabling the processor to define the hotspot by identifying vertices that form a polygon.

44. The computer system of claim 39, wherein the defining process comprises a second defining process enabling the processor to define the hotspot automatically.

45. The computer system of claim 44, wherein the defining process enables the processor to define the hotspot automatically with a flood-fill algorithm.

46. The computer system of claim 44, wherein the defining process enables the processor to define the hotspot automatically with the rays algorithm.

47. The computer system of claim 44, further comprising a marking process that enables the processor to mark the hotspot in the video with a surface overlapping the hotspot.

48. The computer system of claim 47, wherein the surface is a translucent surface.

49. The computer system of claim 39, wherein the tracking process comprises a second tracking process cabling the processor to track the hotspot manually.

50. The computer system of claim 49, wherein the computer further comprises a mouse with buttons, wherein the buttons on the mouse are depressed to enable the processor to track the hotspot manually.

51. The computer system of claim 39, wherein the second tracking process enables the processor to automatically track the location of the hotspot.

52. The computer system of claim 51, wherein the second tracking process enables the processor to automatically track the size of the hotspot.

53. The computer system of claim 51, wherein the selective enumeration process, comprises:

a second selective enumeration process enabling the processor to selectively enumerate position of the hotspot; and a third selective enumeration process enabling the processor to selectively enumerate size of the hotspot.

54. The computer system of claim 39, wherein the scoring process comprises a comparing process enabling the processor to compare the luminance delta of corresponding pixels in the frame and the another frame.

55. The computer system of claim 39, wherein the scoring process comprises a comparing process enabling the processor to compare each enumeration of the hotspot in the another frame with a signature of the hotspot in the frame.

56. The computer system of claim 39, further comprising a filtering process enabling the processor to filter the frame.

57. The computer system of claim 39, further comprising a declaring process enabling the processor to declare tracking failure.

58. The computer system of claim 39, further comprising:

a second defining process enabling the processor to define the hotspot in a second frame of video; and an interpolating process enabling the processor to interpolate the position and size of the hotspot in intermediate frames of video between the franie and the second frame.

59. The computer system of claim 39, wherein the linking process further comprises a second linking process enabling the processor to link the hotspot to two or more of the plurality of targets on two or more levels.

60. The computer system of claim 39, wherein the linking process further comprises a second linking process enabling the processor to link the hotspot to at least two or more of the plurality of targets on one level.

61. The computer system of claim 60, wherein the second linking process comprises a third linking process enabling the processor to link the hotspot to two or more of the plurality of targets on two or more levels.

62. The computer system of claim 60, wherein the second linking process further comprises a designating process enabling the processor to designate at cast one of the at least two or more of the plurality of targets as a leader target.

63. The computer system of claim 39, wherein the video is a target in another plurality of targets on one or more levels.

64. The computer system of claim 63, wherein the another plurality of targets are base targets.

65. The computer system of claim 39, wherein the scoring process comprises a comparing process enabling the processor to compare the RGB delta Of corresponding pixels in the frame and the another frame.

* * * * *